(12) United States Patent
Nagashima et al.

(10) Patent No.: US 11,702,008 B2
(45) Date of Patent: Jul. 18, 2023

(54) VEHICLE OUTER MIRROR DEVICE, VEHICLE OUTER MIRROR SYSTEM, AND METHOD FOR CONTROLLING VEHICLE OUTER MIRROR DEVICE

(71) Applicant: MISATO INDUSTRIES CO., LTD., Fujioka (JP)

(72) Inventors: Yasuo Nagashima, Kanagawa (JP); Takahiro Tsuzuki, Kanagawa (JP); Katsushi Oseki, Kanagawa (JP)

(73) Assignee: MISATO INDUSTRIES CO., LTD., Fujioka (JP)

( * ) Notice: Subject to any disclaimer, the term of this patent is extended or adjusted under 35 U.S.C. 154(b) by 0 days.

(21) Appl. No.: 17/056,615

(22) PCT Filed: May 22, 2019

(86) PCT No.: PCT/JP2019/020359
§ 371 (c)(1),
(2) Date: Nov. 18, 2020

(87) PCT Pub. No.: WO2019/225671
PCT Pub. Date: Nov. 28, 2019

(65) Prior Publication Data
US 2021/0206319 A1 Jul. 8, 2021

(30) Foreign Application Priority Data

May 22, 2018 (JP) ................. 2018-097963
May 22, 2018 (JP) ................. 2018-097964
May 22, 2018 (JP) ................. 2018-097965

(51) Int. Cl.
*B60R 1/06* (2006.01)

(52) U.S. Cl.
CPC ........ *B60R 1/0602* (2013.01); *B60R 2300/30* (2013.01); *B60R 2300/8046* (2013.01)

(58) Field of Classification Search
CPC .......... B60R 1/0602; B60R 2300/30; B60R 2300/8046; B60R 2001/1253; B60R 1/12; H04N 7/18
See application file for complete search history.

(56) References Cited

U.S. PATENT DOCUMENTS

2004/0196368 A1* 10/2004 Asai .................. B60R 1/00
                                                        348/148
2015/0353024 A1   12/2015 Cooper
2018/0143298 A1*  5/2018 Newman ............ G01C 21/3484

FOREIGN PATENT DOCUMENTS

CN      204936966 U    1/2016
JP      7-186831 A     7/1995
(Continued)

OTHER PUBLICATIONS

International Search Report dated Aug. 20, 2019 in PCT/JP2019/020359 filed on May 22, 2019, 2 pages.
(Continued)

*Primary Examiner* — Sath V Perungavoor
*Assistant Examiner* — Tyler B Edwards
(74) *Attorney, Agent, or Firm* — Oblon, McClelland, Maier & Neustadt, L.L.P.

(57) ABSTRACT

A vehicle outer mirror device includes a housing, a mirror main body, a mirror drive unit, and an imaging unit. The housing is attached to a door of a vehicle and includes an opening facing rear of the vehicle. The mirror main body is disposed in the opening of the housing and has a light reflection region reflecting light entering from outside of the housing and a light transmission region capable of transmitting the light to inside of the housing. The mirror drive unit is disposed inside the housing and adjusts an orientation of the mirror main body. The imaging unit is fixed inside the housing, images the rear of the vehicle through the light transmission region, and is disposed in a state in which an (Continued)

imaging optical axis is inclined toward the outside of the vehicle with respect to a reflection optical axis of the light reflection region.

5 Claims, 18 Drawing Sheets

(56) References Cited

FOREIGN PATENT DOCUMENTS

| | | | |
|---|---:|---|---:|
| JP | 10-16725 A | | 1/1998 |
| JP | H-1016725 A | * | 1/1998 |
| JP | 2000-85474 A | | 3/2000 |
| JP | 2000085474 A | * | 3/2000 |
| JP | 2001-018720 A | | 1/2001 |
| JP | 2003-95028 A | | 4/2003 |
| JP | 2004-299525 A | | 10/2004 |
| JP | 2004299525 A | * | 10/2004 |
| JP | 2004-306670 A | | 11/2004 |
| JP | 2006-168674 A | | 6/2006 |
| JP | 2007-137098 A | | 6/2007 |
| JP | 2007137098 A | * | 6/2007 |

OTHER PUBLICATIONS

Japanese Office Action issued in Japanese Patent Publication No. 2020-520349 dated Apr. 25, 2023, (w/ English translation).

* cited by examiner

VEHICLE OUTER MIRROR DEVICE, VEHICLE OUTER MIRROR SYSTEM, AND METHOD FOR CONTROLLING VEHICLE OUTER MIRROR DEVICE

FIELD

The present invention relates to a vehicle outer mirror device, a vehicle outer mirror system, and a method for controlling the vehicle outer mirror device.

BACKGROUND

As a vehicle outer mirror device, for example, a structure including a mirror main body, a mirror drive unit for adjusting the orientation of the mirror main body, and a housing for holding the mirror main body and the mirror drive unit is known (for example, see Patent Literature 1).

CITATION LIST

Patent Literature

Patent Literature 1: JP 2006-168674 A

SUMMARY

Technical Problem

In recent years, a technique has been developed in which an imaging unit is attached to a vehicle outer mirror device, an image in the rear of the vehicle is captured by the imaging unit, and the captured image is displayed on a display unit in the vehicle. However, when the imaging unit is attached to the outer side of the housing, the appearance of the vehicle outer mirror device greatly changes.

The present invention has been made in view of the matter described above, and an object of the present invention is to provide a vehicle outer mirror device, a vehicle outer mirror system, and a method for controlling the vehicle outer mirror device that are capable of accommodating an imaging unit without greatly changing the appearance.

Solution to Problem

A vehicle outer mirror device according to the present invention includes: a housing attached to a door of a vehicle and including an opening facing rear of the vehicle; a mirror main body disposed in the opening of the housing and having a light reflection region reflecting light entering from outside of the housing and a light transmission region capable of transmitting the light to inside of the housing; a mirror drive unit disposed inside the housing and configured to adjust an orientation of the mirror main body; and an imaging unit fixed inside the housing, imaging the rear of the vehicle through the light transmission region, and disposed in a state in which an imaging optical axis is inclined toward the outside of the vehicle with respect to a reflection optical axis of the light reflection region.

In the vehicle outer mirror device described above, the imaging unit may be fixed on an inner surface of the mirror main body, and the inner surface faces the inside of the housing.

In the vehicle outer mirror device described above, the mirror drive unit may be configured to adjust the orientation of the mirror main body by rotating the mirror main body around a vertical axis within a certain range at least in a vehicle mounted state, and the imaging unit may be disposed such that the imaging optical axis is inclined outward with respect to an axis parallel to a front-rear direction of the vehicle, in a state in which the mirror main body is disposed in a central position of the range in which the mirror main body is rotatable around the vertical axis.

In the vehicle outer mirror device described above, the light transmission region may have a rectangular shape.

A vehicle outer mirror system according to the present invention includes the vehicle outer mirror device described above disposed on each of left and right of a vehicle. Of the left and the right vehicle outer mirror devices, disposed on a driver's seat side of the vehicle is a first door mirror device, and disposed on a side opposite to the first door mirror device is a second door mirror device. The second door mirror device has a larger angle between the reflection optical axis and the imaging optical axis than that of the first door mirror device.

A vehicle outer mirror device according to the present invention includes: a housing attached to a door of a vehicle and including an opening facing rear of the vehicle; a mirror main body disposed in the opening of the housing and having a light reflection region reflecting light entering from outside of the housing and a light transmission region capable of transmitting the light to inside of the housing; a mirror drive unit disposed inside the housing and configured to adjust a position of the mirror main body; an imaging unit fixed on an inner surface of the mirror main body and imaging the rear of the vehicle through the light transmission region, the inner surface facing the inside of the housing; and a control unit configured to extract and output an extracted image included in a certain extraction region in a captured image imaged with the imaging unit, and adjust a position of the extraction region in the captured image in accordance with the position of the mirror main body.

In the vehicle outer mirror device described above, the control unit may adjust the position of the extraction region in accordance with an adjustment direction and an adjustment quantity of the position of the mirror main body with the mirror drive unit.

The vehicle outer mirror device described above may include a storage unit configured to store therein the adjustment direction and the adjustment quantity. The control unit may adjust the position of the extraction range on the basis of the adjustment direction and the adjustment quantity stored in the storage unit.

In the vehicle outer mirror device described above, when the position of the extraction region is adjusted, the control unit may calculate a first visual field portion corresponding to the extraction region in a visual field of the imaging unit and, when the position of the mirror main body is changed with the mirror drive unit after the calculation, the control unit may calculate a second visual field portion having a direction with respect to the imaging unit and an angle range that are equal to those of the first visual field portion in the visual field after change, and set a region on the captured image corresponding to the second visual field portion as the extraction region.

In the vehicle outer mirror device described above, the control unit may calculate a movement direction and a movement quantity of the visual field of the imaging unit on the basis of the adjustment direction and the adjustment quantity of the position of the mirror main body with the mirror drive unit and, on the basis of calculation results thereof, calculate the second visual field portion.

In the vehicle outer mirror device described above, the extracted image may be an image displayed on a display unit of the vehicle.

A method according to the present invention is a method for controlling a vehicle outer mirror device that includes: a housing attached to a door of a vehicle and including an opening facing rear of the vehicle; a mirror main body disposed in the opening of the housing and having a light reflection region reflecting light entering from outside of the housing and a light transmission region capable of transmitting the light to inside of the housing;

a mirror drive unit disposed inside the housing and adjusting a position of the mirror main body; and an imaging unit fixed on an inner surface of the mirror main body and imaging the rear of the vehicle through the light transmission region, the inner surface facing the inside of the housing. The method includes: extracting and outputting an extracted image included in a certain extraction region in a captured image imaged with the imaging unit; and adjusting a position of the extraction region in the captured image in accordance with the position of the mirror main body.

A vehicle outer mirror device according to the present invention includes: a housing attached to a door of a vehicle and including an opening facing rear of the vehicle; a mirror main body disposed in the opening of the housing and having a light reflection region reflecting light entering from outside of the housing; and a nozzle provided on the housing and ejecting fluid toward the mirror main body.

In the vehicle mirror device described above, the nozzle may be disposed on a side of the mirror main body as viewed from an axis direction of a reflection optical axis of the light reflection region. The mirror main body may include a light transmission region capable of transmitting the light entering from the outside of the housing to inside of the housing and being movable between a set position set with the vehicle and a cleaning position where the light transmission region is disposed in an ejection direction of the fluid ejected from the nozzle. The vehicle mirror device may include an imaging unit fixed inside the housing and imaging rear of the vehicle via the light transmission region.

The vehicle outer mirror device described above may include: a mirror drive unit disposed inside the housing and configured to adjust a position of the mirror main body between the set position and the cleaning position; and a control unit configured to cause the nozzle to perform a non-cleaning operation of not ejecting the fluid and a cleaning operation of ejecting the fluid in a switching manner in accordance with an instruction from the vehicle, and control the mirror drive unit to dispose the mirror main body in the set position when causing the nozzle to perform the non-cleaning operation and dispose the mirror main body in the cleaning position when causing the nozzle to perform the cleaning operation.

The vehicle outer mirror device described above, may include a storage unit configured to store therein the set position. The control unit may control the mirror drive unit such that, after the fluid is ejected, the mirror main body disposed in the cleaning position is disposed in the previous set position before the mirror main body is moved to the cleaning position among a plurality of the set positions stored in the storage unit.

A method according to the present invention is a method for controlling a vehicle outer mirror that includes: a housing attached to a door of a vehicle and including an opening facing rear of the vehicle; a mirror main body disposed in the opening of the housing, having a light reflection region reflecting light entering from outside of the housing and a light transmission region capable of transmitting the light entering from the outside of the housing to inside of the housing, and being movable between a set position set with the vehicle and a cleaning position where the light transmission region is disposed in an ejection direction of fluid ejected from a nozzle; an imaging unit fixed inside the housing and imaging the rear of the vehicle through the light transmission region; a mirror drive unit disposed inside the housing and configured to adjust a position of the mirror main body between the set position and the cleaning position; and the nozzle provided on the housing and ejecting the fluid toward the mirror main body. The method includes: causing the nozzle to perform a non-cleaning operation of not ejecting the fluid and a cleaning operation of ejecting the fluid in a switching manner in accordance with an instruction from the vehicle; disposing the mirror main body in the set position when causing the nozzle to perform the non-cleaning operation;

and disposing the mirror main body in the cleaning position when causing the nozzle to perform the cleaning operation.

Advantageous Effects of Invention

According to the present invention, there is provided a vehicle outer mirror device, a vehicle outer mirror system, and a method for controlling the vehicle outer mirror device that are capable of accommodating the imaging unit without greatly changing the appearance.

DESCRIPTION OF EMBODIMENTS

A vehicle outer mirror device, a vehicle outer mirror system, and a method for controlling the vehicle outer mirror device according to the present invention will now be described hereinafter with reference to drawings. The present invention is not limited to the embodiments. Constituent elements in the following embodiments include elements that can be replaced or can easily be replaced by a person skilled in the art, or elements that are substantially the same.

In the following explanation, a front-rear direction, an up-down direction, and a left-right direction are directions in a vehicle mounted state in which the vehicle outer mirror device and the vehicle outer mirror system are mounted on the vehicle, when viewing the traveling direction of the vehicle from the driver's sheet. In the present embodiment, the up-down direction is parallel to the vertical direction, and the left-right direction is a horizontal direction.

First Embodiment

Figure 1:
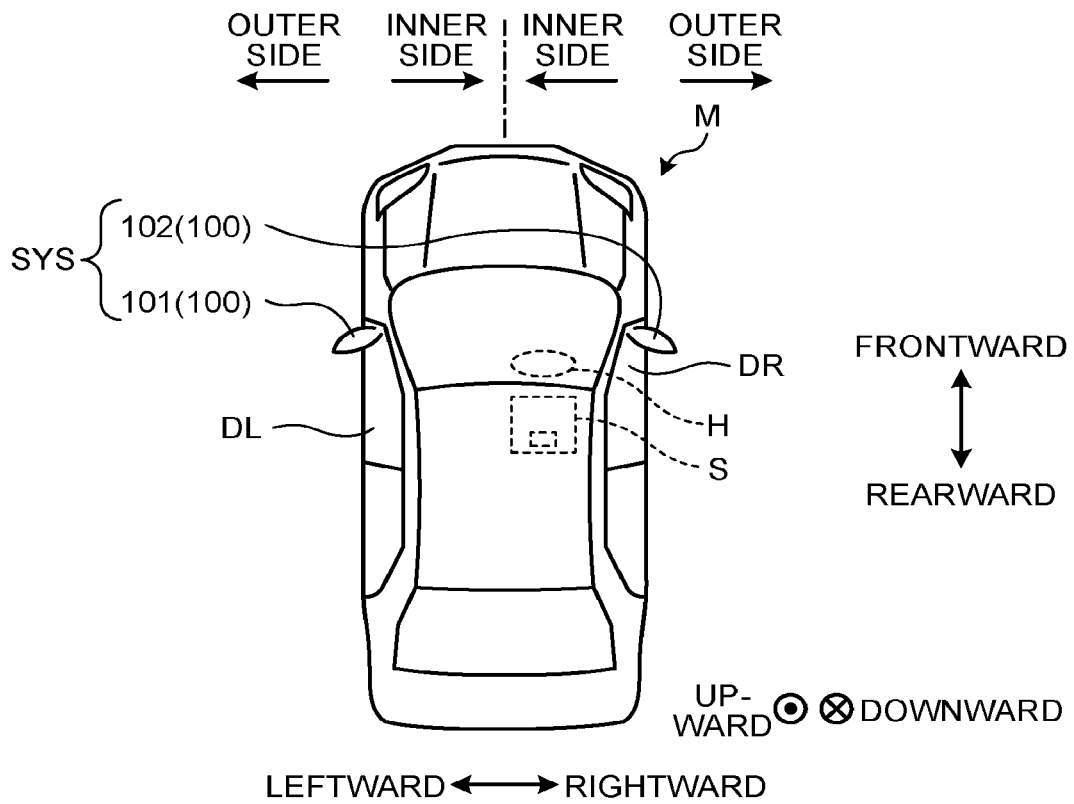
FIG. 1 is a plan view illustrating an example of a vehicle outer mirror system according to a first embodiment.

FIG. 1 is a plan view illustrating an example of a vehicle M including a door mirror system SYS according to a first embodiment. The door mirror system SYS includes door mirror devices 100 attached to left and right doors DL and DR of the vehicle M. The left and right door mirror devices 100 are substantially symmetrical in the left-right direction. When the left and right door mirror devices 100 are distinguished from each other hereinafter, the door mirror device attached to the left door of the vehicle M is referred to as "door mirror device 101", and the door mirror device attached to the right door of the vehicle M is referred to as "door mirror device 102". In the present embodiment, a vehicle in which a steering wheel H is disposed on the right seat (driver's seat) S is illustrated as an example of the vehicle M.

Figure 2:
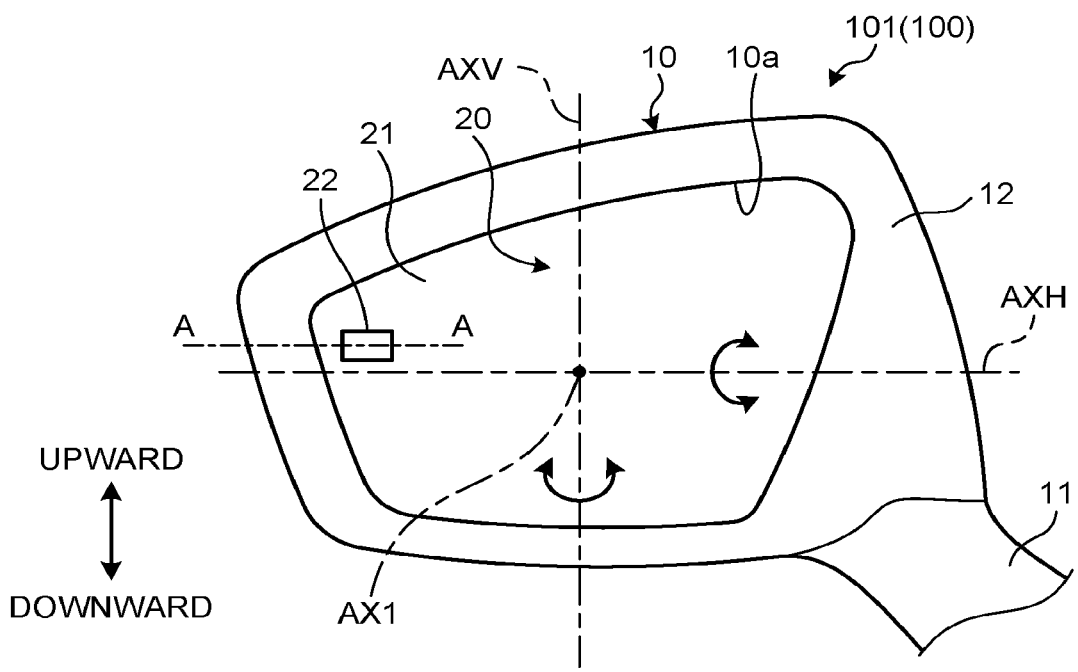
FIG. 2 is a diagram illustrating an example of an outer mirror device.
Figure 3:
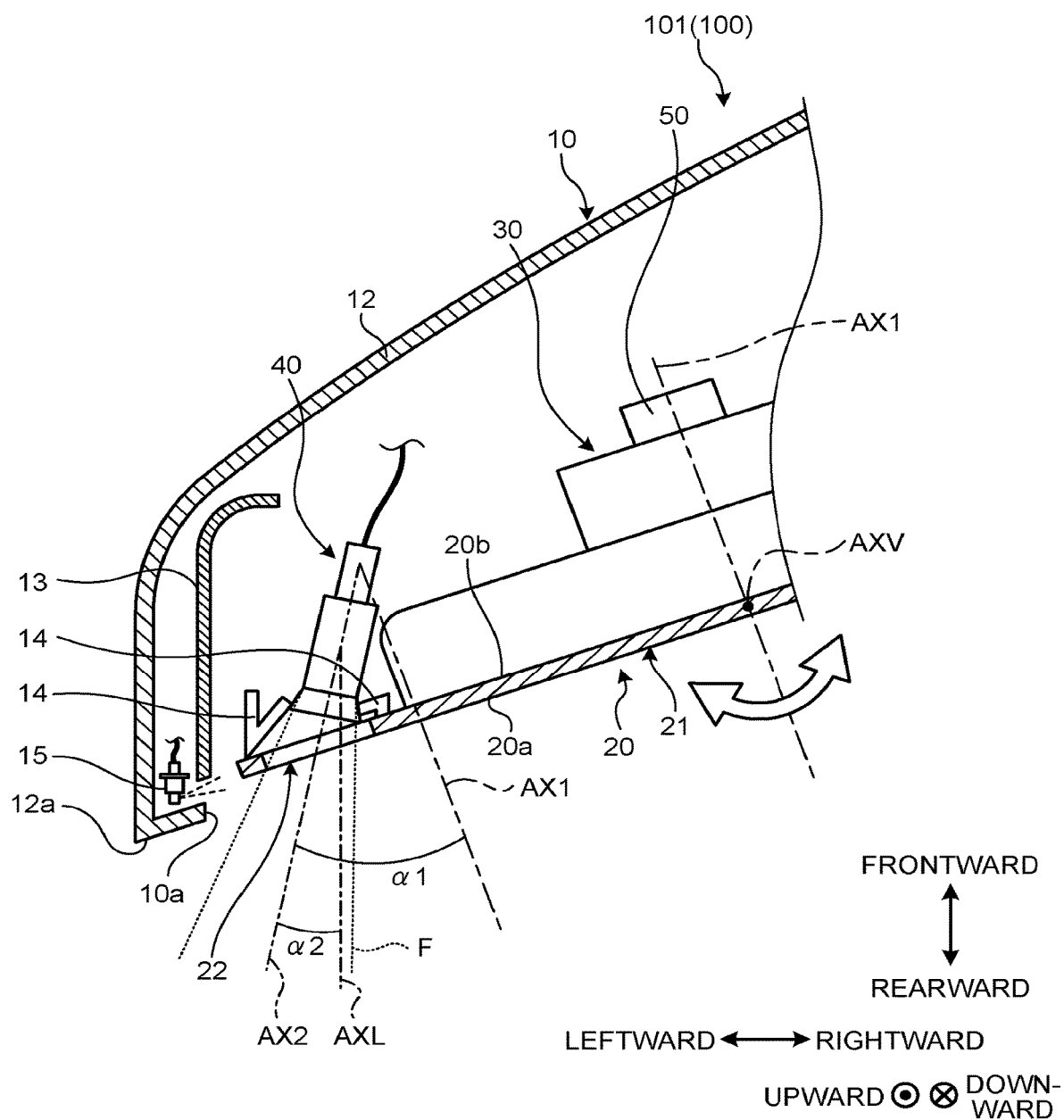
FIG. 3 is a diagram illustrating an inner structure of a left outer mirror device.
Figure 4:
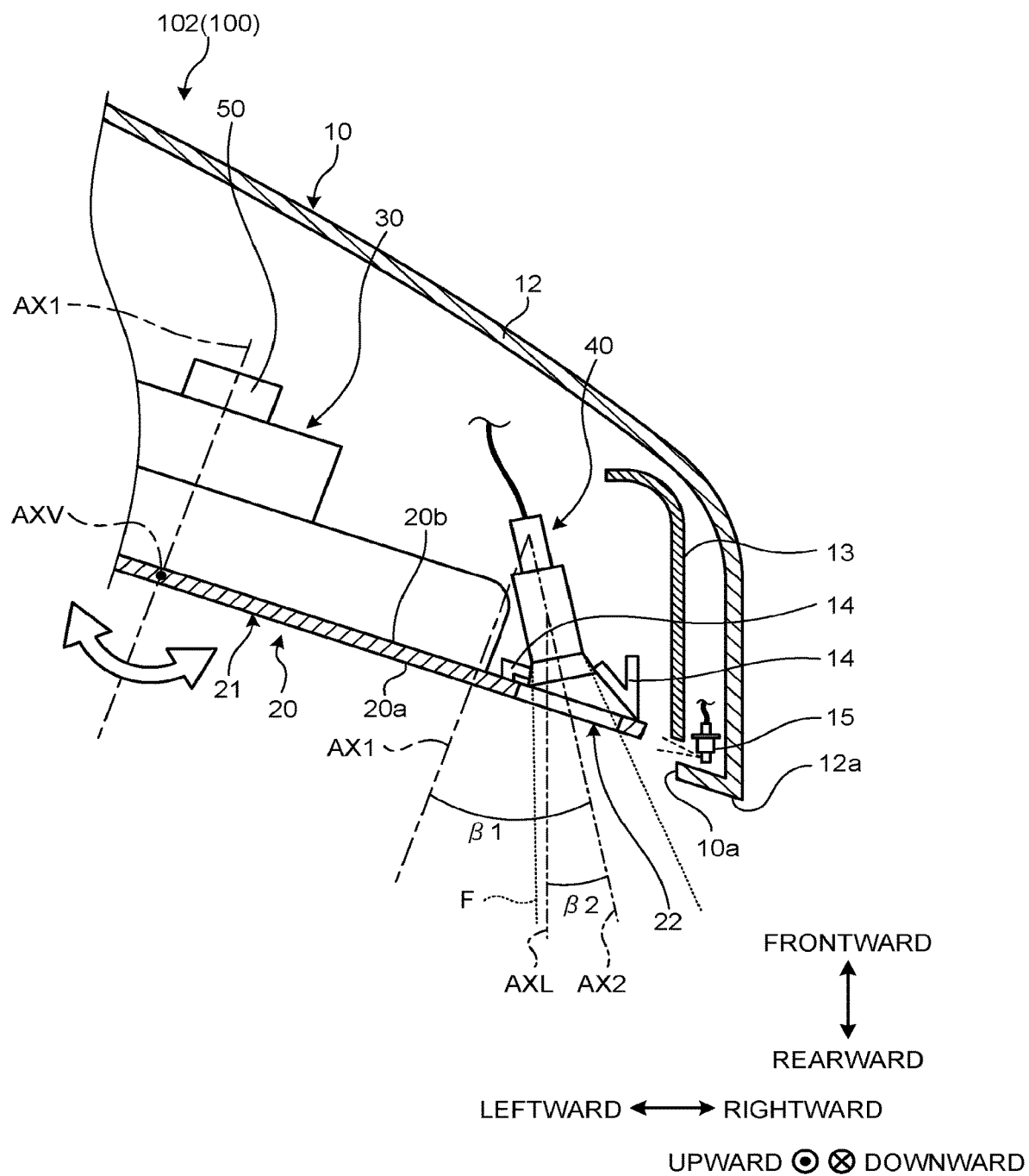
FIG. 4 is a diagram illustrating an inner structure of a right outer mirror device.

FIG. 2 is a diagram illustrating an example of the door mirror device 100. FIG. 2 illustrates the left door mirror device 101. FIG. 3 is a diagram illustrating a structure along an A-A cross section in FIG. 2, and illustrates the inner structure of the left door mirror device 101. FIG. 4 is a diagram corresponding to FIG. 3, and illustrates the inner structure of the right door mirror device 102. As illustrated in FIG. 2 to FIG. 4, the door mirror device 100 includes a housing 10, a mirror main body 20, a mirror drive unit 30, an imaging unit 40, and a control unit 50. The control unit 50 comprehensively controls operations of the door mirror device 100. The control unit 50 controls, for example, operations of the housing 10, a nozzle 15, the mirror drive unit 30, and the imaging unit 40 described later.

The housing 10 is attached to the left door DL or the right door DR of the vehicle M. The housing 10 includes a base portion 11, a casing 12, and an inner wall portion 13. The base portion 11 is fixed on the left door DL or the right door DR. The casing 12 is connected with the base portion 11. The casing 12 is provided rotatably with respect to an axis (vertical axis) perpendicular to the vertical direction, with a rotation drive source (not illustrated). The casing 12 is rotatable between an open position (position illustrated in FIG. 1 and FIG. 2 and the like) in which the door mirror device 100 is in an opened state and a closed position in which the door mirror device 100 is in a closed state. The casing 12 includes an edge portion 12a. The edge portion 12a has an annular shape, and forms an opening 10a of the housing 10. The opening 10a faces the rear of the vehicle M, in a state in which the door mirror device 100 is disposed in the open position. The inner wall portion 13 is provided along a wall portion located on the outer side of the vehicle M inside the casing 12.

The mirror main body 20 is formed in a plate shape using, for example, glass or resin. The mirror main body 20 is disposed in the opening 10a of the housing 10. The mirror main body 20 is supported with the housing 10 via the mirror drive unit 30. The mirror main body 20 has a light reflection region 21 and a light transmission region 22. The light reflection region 21 is formed by depositing metal, such as aluminum and silver, on an outer surface 20a side, for example, facing the outside of the housing 10 in the mirror main body 20. The light reflection region 21 reflects light entering from the outside of the housing 10. The light reflection region 21 is provided over substantially the whole part other than the region provided with the light transmission region 22 described below.

The light transmission region 22 is provided on part of the outer surface 20a of the mirror main body 20, and capable of transmitting exterior light. The light transmission region 22 may have a structure in which a film reflecting part of exterior light and transmitting part of the exterior light, such as a semi-transmitting reflection film, is formed on, for example, the outer surface 20a of the mirror main body 20.

As another example, the light transmission region 22 may have a structure in which no light reflection film is formed on the outer surface 20a of the mirror main body 20 and almost all the exterior light is transmitted in a state in which the glass or the resin layer is exposed. The light transmission region 22 has, for example, a rectangular shape as viewed from the axis direction of a reflection optical axis AX1 of the light reflection region 21, and is formed in a range wider than a visual field F of the imaging unit 40 described later. The light transmission region 22 having a rectangular shape reduces discomfort in appearance.

In the casing 12 of the housing 10, the nozzle 15 is provided on the inner surface side of the edge portion 12a. The nozzle 15 ejects fluid, such as cleaning liquid and air, to the light transmission region 22. The nozzle 15 enables cleaning of the light transmission region 22.

The mirror drive unit 30 adjusts the orientation of the mirror main body 20. The mirror drive unit 30 is disposed inside the housing 10. The mirror drive unit 30 includes a drive source and a transmission mechanism, and is capable of changing the orientation of the mirror main body 20 and changing the direction of the reflection optical axis AX1 of the light reflection region 21 by transmitting the driving force of the drive source to the mirror main body 20 with the transmission mechanism. The mirror drive unit 30 is capable of rotating the mirror main body 20 in a certain movable range, for example, in each of the direction around a vertical axis AXV and the direction around a horizontal axis AXH. This structure allows the reflection optical axis AX1 of the light reflection region 21 to be directed in a desired direction, by combining adjustment in the direction around the vertical axis AXV and adjustment in the direction around the horizontal axis AXH. The vertical axis AXV is a virtual straight line parallel to the vertical direction. The horizontal axis AXH is a virtual straight line orthogonal to each of the vertical axis AXV and the reflection optical axis AX1 of the light reflection region 21.

The imaging unit 40 images the rear of the vehicle M via the light transmission region 22. The image imaged with the imaging unit 40 is displayed on a display unit (not illustrated) in the vehicle M. For example, a CMOS camera or the like is used as the imaging unit 40. In the present embodiment, the imaging unit 40 is fixed inside the housing 10 and, for example, fixed on an inner surface 20b of the mirror main body 20 facing the inside of the housing 10. When the orientation of the mirror main body 20 is changed with the mirror drive unit 30, the imaging unit 40 is moved as one unitary piece together with change of the orientation of the mirror main body 20. A space between the imaging unit 40 and the mirror main body 20 is sealed with a light shield portion 14. The light shield portion 14 is provided to surround the light transmission region 22, fixes the imaging unit 40 on the inner surface 20b of the mirror main body 20, and shields light going from the space between the edge portion 12a and the mirror main body 20 toward the imaging unit 40 described below.

The imaging unit 40 is disposed in a state in which an imaging optical axis AX2 is inclined toward the outside of the vehicle M with respect to the reflection optical axis AX1 of the light reflection region 21. In the vehicle M, the left and the right door mirror devices 100 are arranged on the outer side of the vehicle with respect to the driver's seat S. For this reason, in order for the driver of the vehicle M in the driver's seat S to check the rear with the door mirror devices 100, the reflection optical axis AX1 of the mirror main body 20 is required to be directed inward the front-rear axis AXL.

By contrast, the imaging unit 40 is disposed in a state in which the imaging optical axis AX2 is inclined toward the outside of the vehicle M with respect to the reflection optical axis AX1 of the light reflection region 21. For this reason, when the reflection optical axis AX1 is in a state of being inclined toward the inside of the vehicle M, the imaging optical axis AX2 of the imaging unit 40 is enabled to be directed in a direction along the front-rear axis AXL.

Figure 5:
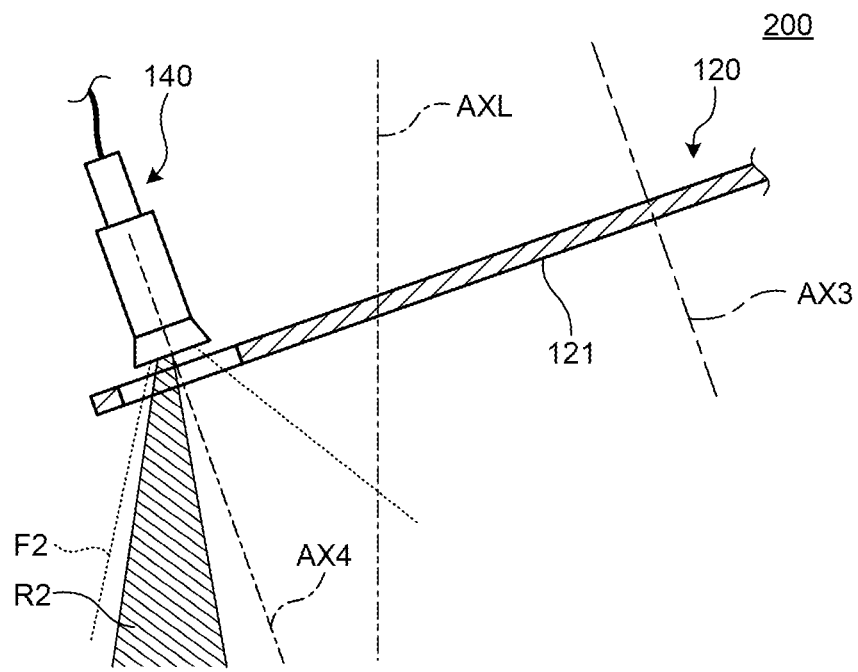
FIG. 5 is a diagram of an outer mirror device according to a comparative example, illustrating a case where an imaging optical axis of an imaging unit is disposed in a state parallel to a reflection optical axis of a light reflection region.

FIG. 5 is a diagram of a door mirror device 200 according to a comparative example, illustrating a case where an imaging optical axis AX4 of an imaging unit 140 is disposed parallel to a reflection optical axis AX3 of a light reflection region 121. In the door mirror device 200 illustrated in FIG. 5, because the reflection optical axis AX3 of the mirror main body 120 is directed inward the front-rear axis AXL, the imaging optical axis AX4 is also directed inward the front-rear axis AXL. In this state, when the rear of the vehicle is imaged with the imaging unit 140, because only an image imaged in a range R2 shifted outward in the left-right direction from the center in the visual field portion F2 of the imaging unit 140 is used, the usable pixels of the imaging unit 140 are limited, and it becomes difficult to acquire a clear image.

Figure 6:
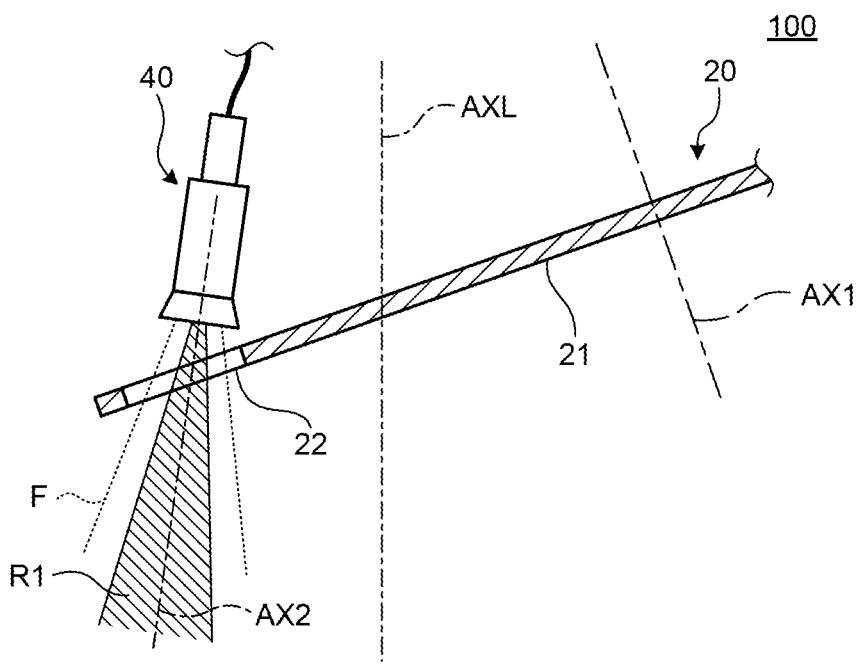
FIG. 6 is a diagram of the outer mirror device according to the first embodiment, illustrating a case where the imaging optical axis of the imaging unit is disposed in a state inclined outward the reflection optical axis of the light reflection region.

FIG. 6 is a diagram of the door mirror device 100 according to the present embodiment, illustrating a case where the imaging optical axis AX2 of the imaging unit 40 is disposed in a state of being inclined outward the reflection optical axis AX1 of the light reflection region 21. In the case illustrated in FIG. 6, even in the state where the reflection optical axis AX1 is inclined toward the inside of the vehicle M, the imaging optical axis AX2 of the imaging unit 40 is directed in a direction along the front-rear axis AXL. For this reason, when the rear of the vehicle M is imaged with the imaging unit 40, it is possible to use an image imaged in a range R1 including the center in the left-right direction in a visual field F of the imaging unit 40. This structure enables use of more pixels in the left-right direction, and enables acquisition of a clear image.

In addition, in the present embodiment, the left door mirror device 101 disposed on the side opposite to the driver's seat S in the left-right direction has a larger angle between the reflection optical axis AX1 and the imaging optical axis AX2 than that in the right door mirror device 102 disposed on the driver's seat S side. In the left door mirror device 101, the angle α1 (see FIG. 3) between the reflection optical axis AX1 and the imaging optical axis AX2 can be set to, for example, 20° to 30°. In the right door mirror device 102, the angle β1 (see FIG. 4) between the reflection optical axis AX1 and the imaging optical axis AX2 can be set to, for example, 10° to 20°.

The door mirror device 102 on the driver's seat S side is closer to the driver than the door mirror device 101 on the side opposite to the driver's seat S is. For this reason, when the orientation of the mirror main body 20 is adjusted, generally, the reflection optical axis AX1 of the mirror main body 20 in the door mirror device 101 on the side opposite to the driver's seat S is used in a state of being directed more toward the inside of the vehicle M than the reflection optical axis AX1 of the mirror main body 20 in the door mirror device 102 on the driver's seat S side.

In the present embodiment, the imaging unit 40 is fixed on the inner surface 20b of the mirror main body 20, and the imaging optical axis AX2 is changed as one unitary piece with the mirror main body 20. For example, as the reflection optical axis AX1 of the mirror main body 20 is directed more toward the inside of the vehicle M, the imaging optical axis AX2 is also directed toward the inside of the vehicle M. In addition, as the reflection optical axis AX1 of the mirror main body 20 is directed more toward the outside of the vehicle M, the imaging optical axis AX2 is also directed toward the outside of the vehicle M.

For this reason, as in the present embodiment, it is possible to suppress occurrence of a difference between angles α2 and β2 between the imaging optical axis AX2 and the front-rear axis AXL between the left and the right imaging units 40, by setting a larger angle between the reflection optical axis AX1 and the imaging optical axis AX2 in the left door mirror device 101 disposed on the side opposite to the driver's seat S in the left-right direction than that in the right door mirror device 102 disposed on the driver's seat S side. This structure suppresses occurrence of a difference in the visual field F between the left and the right imaging units 40.

Figure 7:
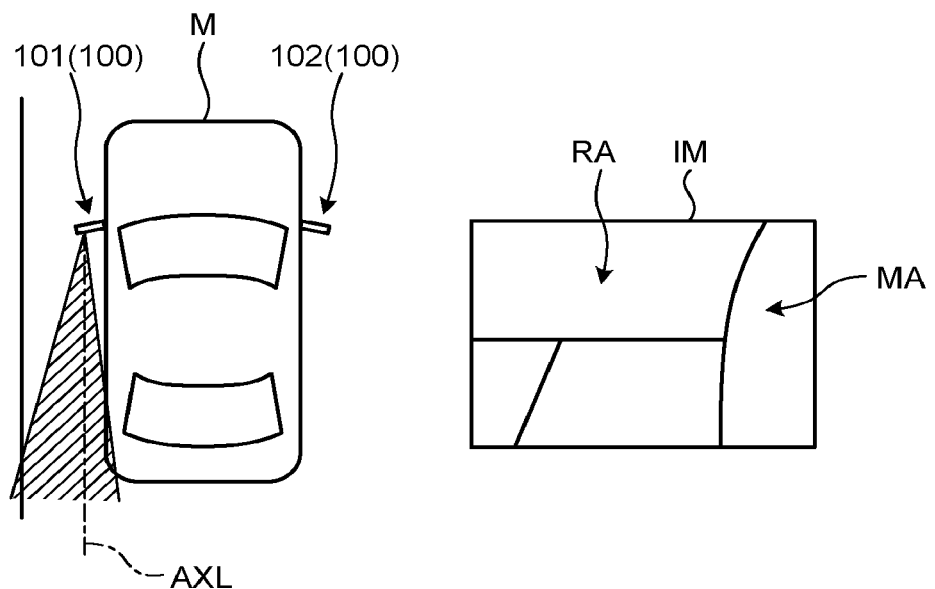
FIG. 7 is a diagram illustrating an example of an image displayed on a display unit in the vehicle and an imaging range of the imaging unit corresponding to the image.

FIG. 7 is a diagram illustrating an example of an image IM displayed on the display unit in the vehicle M and an imaging range of the imaging unit 40 corresponding to the image IM. FIG. 7 illustrates the left door mirror device 101 as an example, but a similar explanation can be applied to the right door mirror device 102. As illustrated in FIG. 7, the image IM displayed on the display unit includes part MA of the vehicle M and a rear scene RA in the rear of the vehicle M. In the image IM, the rear scene RA occupies a wider region in the left-right direction than the part MA of the vehicle M. In this case, the imaging range of the imaging unit 40 is a range extending toward the outer side of the vehicle M with respect to the front-rear axis AXL. In this manner, the imaging unit 40 is required to image the outer side of the vehicle M with a wider range than that of the inner side of the vehicle M with respect to the front-rear axis AXL. For this reason, in the present embodiment, the imaging unit 40 is disposed such that the imaging optical axis AX2 is inclined outward the front-rear axis AXL, in an initial state in which the mirror main body 20 is disposed in a central position in a range in which the mirror main body 20 is rotatable around the vertical axis AXV. This structure enables the imaging unit 40 to easily image the outer side of the vehicle M with respect to the front-rear axis AXL with a wider range than that of the inner side of the vehicle M.

As described above, each of the door mirror devices 100 according to the present embodiment includes the housing 10 attached to the door DL or DR of the vehicle M and including the opening 10a facing the rear of the vehicle M, the mirror main body 20 disposed in the opening 10a of the housing 10 and having the light reflection region 21 reflecting light entering from the outside of the housing 10 and the light transmission region 22 capable of transmitting the light to the inside of the housing 10, the mirror drive unit 30 disposed inside the housing 10 and configured to adjust the orientation of the mirror main body 20, and the imaging unit 40 fixed inside the housing 10, imaging the rear of the vehicle M through the light transmission region 22, and disposed in a state in which the imaging optical axis AX2 is inclined toward the outside of the vehicle M with respect to the reflection optical axis AX1 of the light reflection region 21.

With this structure, the imaging optical axis AX2 of the imaging unit 40 is disposed in the state of being inclined toward the outside of the vehicle M with respect to the reflection optical axis AX1 of the light reflection region 21. This structure suppresses increase of the angle α2 and the angle β2 between the imaging optical axis AX2 and the front-rear axis AXL, even when the orientation of the mirror main body 20 is adjusted such that the reflection optical axis AX1 is inclined toward the inside of the vehicle M. This structure enables use of the image imaged with the imaging unit 40 with a wide range, and enable use of more pixels in the left-right direction. This structure enables acquisition of a clear image.

In addition, in the door mirror device 100 according to the present embodiment, the imaging unit 40 is fixed on the inner surface 20b of the mirror main body 20 facing the inside of the housing 10. This structure enables movement of the imaging unit 40 and the mirror main body 20 as one unitary piece, and fixes the positional relation between the position of the imaging unit 40 and the light transmission region 22.

In addition, in the door mirror device 100 according to the present embodiment, the mirror drive unit 30 is capable of adjusting the orientation of the mirror main body 20 by rotating the mirror main body 20 around the vertical axis AXV within a certain range at least in the vehicle mounted state, and the imaging unit 40 is disposed such that the imaging optical axis AX2 is directed outward, in a state in which the mirror main body 20 is disposed in a central position of the range in which the mirror main body 20 is rotatable around the vertical axis AXV. This structure enables the imaging unit 40 to image the outer side of the vehicle M with respect to the front-rear axis AXL with a wider range than that of the inner side of the vehicle M.

In addition, in the door mirror device 100 according to the present embodiment, the light transmission region 22 has a rectangular shape. As described above, the light transmission region 22 having a rectangular shape reduces discomfort in appearance.

In the door mirror system SYS according to the present embodiment, the door mirror devices 100 described above are arranged on the left and the right sides of the vehicle. Of the left and the right vehicle outer mirror devices 100, disposed on a driver's seat side of the vehicle is the door mirror device 101, and disposed on a side opposite to the door mirror device 101 is the door mirror device 102, and the door mirror device 102 has a larger angle between the reflection optical axis and the imaging optical axis than that of the door mirror device 101.

This structure enables suppression of occurrence of a distance between the angle α2 and the angle β2 between the imaging optical axis AX2 and the front-rear axis AXL between the imaging unit 40 provided on the left door mirror device 101 and the imaging unit 40 provided on the right door mirror device 102. This structure suppresses occurrence of a difference in the visual field F between the left and the right imaging units 40.

The first embodiment illustrates the case where the imaging unit 40 is fixed on the inner surface 20b of the mirror main body 20 as an example, but the structure is not limited thereto. The imaging unit 40 may be fixed in another position, such as the inner surface of the casing 12 and the inner wall portion 13, as long as it is fixed inside the housing 10.

Second Embodiment

Figure 8:
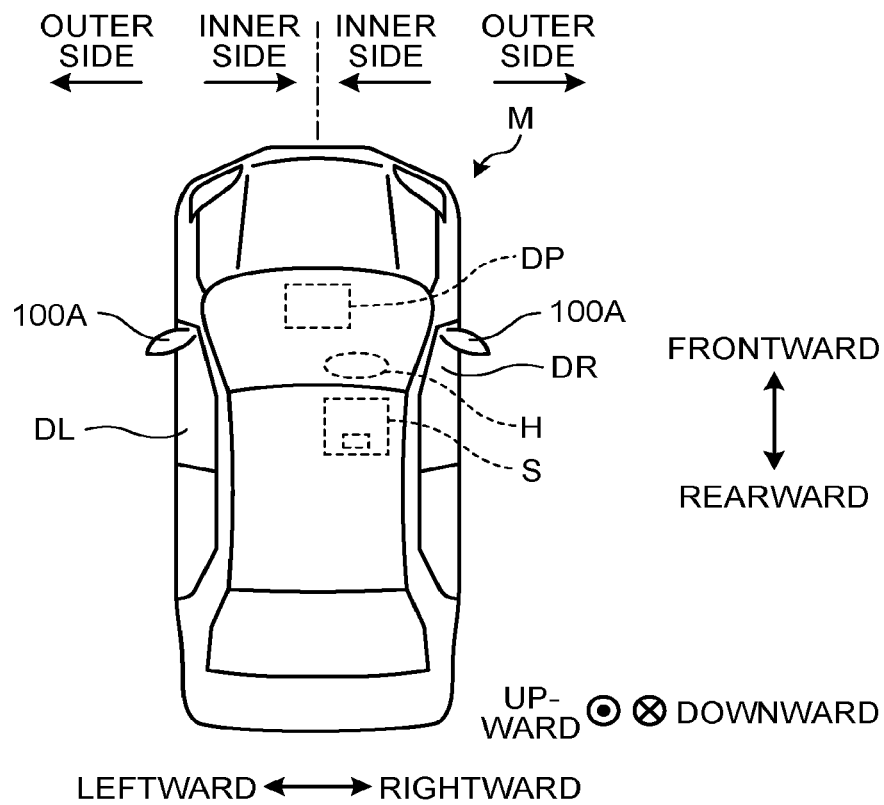
FIG. 8 is a plan view illustrating an example of a vehicle including an outer mirror device according to a second embodiment.

FIG. 8 is a plan view illustrating an example of the vehicle M including door mirror devices 100A according to a second embodiment. The door mirror devices 100A are attached to the left and the right doors DL and DR of the vehicle M. The left and the right door mirror devices 100A are substantially symmetrical in the left-right direction. In the present embodiment, a vehicle in which a steering wheel H is disposed on the right seat (driver's seat) S is illustrated as an example of the vehicle M.

Figure 9:
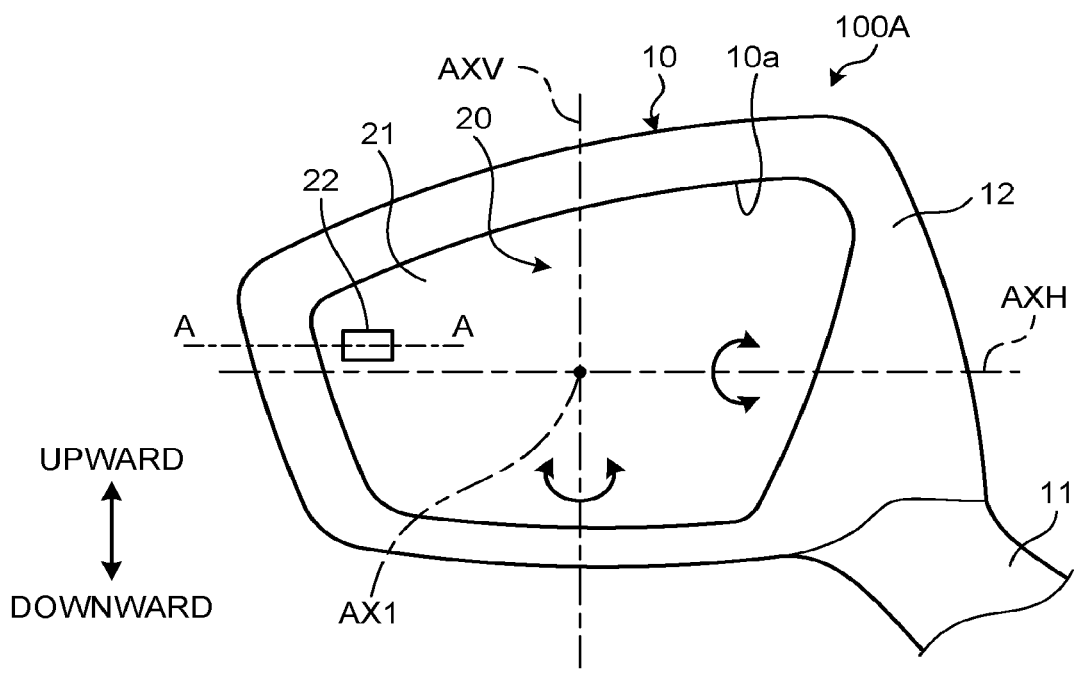
FIG. 9 is a diagram illustrating an example of the outer mirror device.
Figure 10:
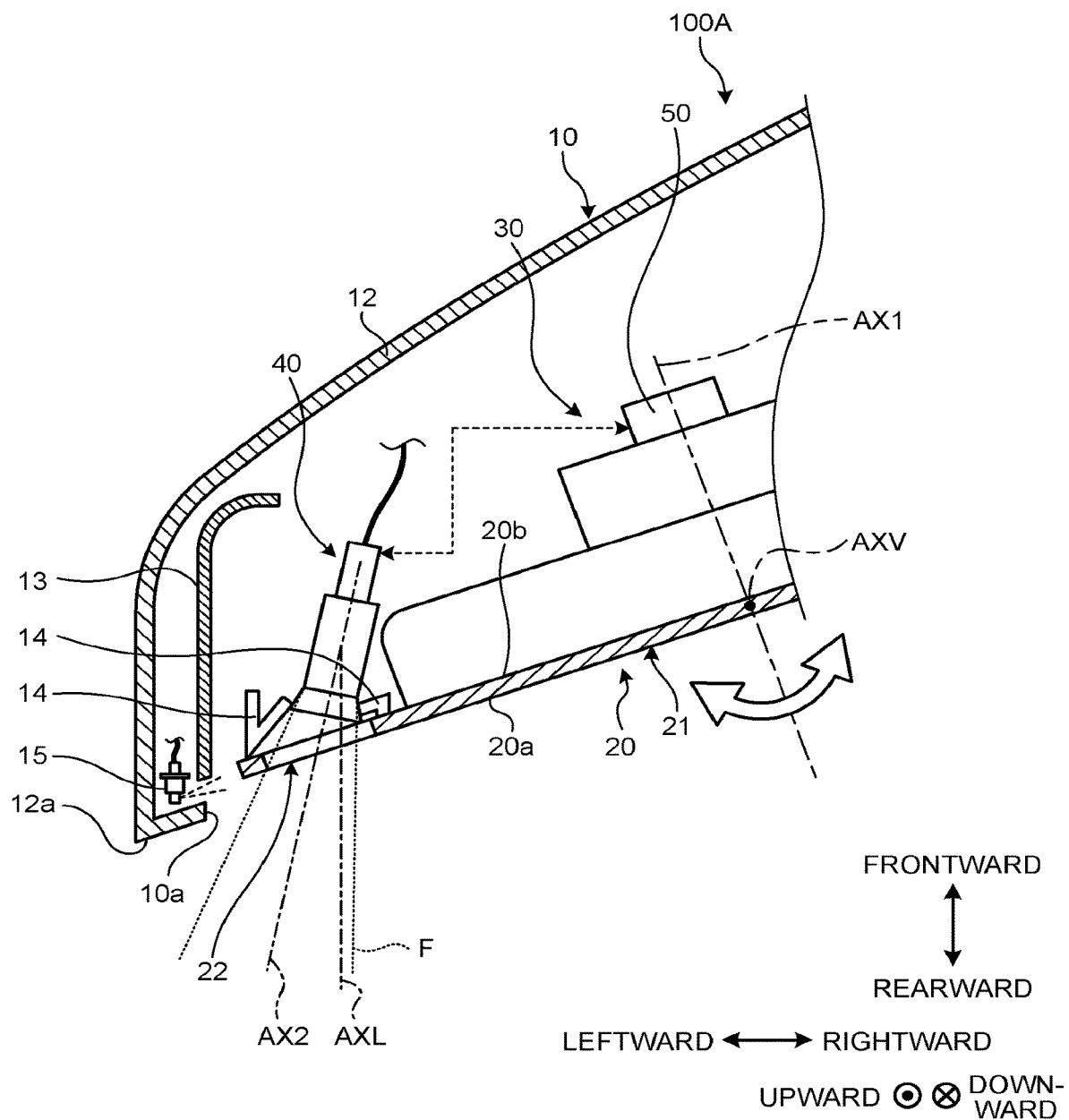
FIG. 10 is a diagram illustrating a structure along an A-A cross section in FIG. 9.

FIG. 9 is a diagram illustrating an example of the door mirror device 100A. FIG. 9 illustrates a left door mirror device 100A. FIG. 10 is a diagram illustrating a structure along an A-A cross section in FIG. 9, and illustrates the inner structure of the left door mirror device 100A. As illustrated in FIG. 9 and FIG. 10 the door mirror device 100A includes a housing 10, a mirror main body 20, a mirror drive unit 30, an imaging unit 40, and a control unit 50. The right door mirror device 100A has a structure similar to and horizontally symmetrical with that of the left door mirror device 100A, and a similar explanation can be applied thereto.

The housing 10 is attached to the left door DL or the right door DR of the vehicle M. The housing 10 includes a base portion 11, a casing 12, and an inner wall portion 13. The base portion 11 is fixed on the left door DL or the right door DR. The casing 12 is connected with the base portion 11. The casing 12 is provided rotatably with respect to an axis (vertical axis) perpendicular to the vertical direction, with a rotation drive source (not illustrated). The casing 12 is rotatable between an open position (position illustrated in FIG. 8 and FIG. 9 and the like) in which the door mirror device 100A is in an opened state and a closed position in which the door mirror device 100A is in a closed state. The casing 12 includes an edge portion 12a. The edge portion 12a has an annular shape, and forms an opening 10a of the housing 10. The opening 10a faces the rear of the vehicle M, in a state in which the door mirror device 100A is disposed in the open position. The inner wall portion 13 is provided along a wall portion located on the outer side of the vehicle M inside the casing 12.

The mirror main body 20 is formed in a plate shape using, for example, glass or resin. The mirror main body 20 is disposed in the opening 10a of the housing 10. The mirror main body 20 is supported with the housing 10 via the mirror drive unit 30. The mirror main body 20 has a light reflection region 21 and a light transmission region 22. The light reflection region 21 is formed by depositing metal, such as aluminum and silver, on an outer surface 20a side, for example, facing the outside of the housing 10 in the mirror main body 20. The light reflection region 21 reflects light entering from the outside of the housing 10. The light reflection region 21 is provided over substantially the whole part other than the region provided with the light transmission region 22 described below.

The light transmission region 22 is provided on part of the outer surface 20a of the mirror main body 20, and capable of transmitting exterior light. The light transmission region 22 may have a structure in which a film reflecting part of exterior light and transmitting part of the exterior light, such as a semi-transmitting reflection film, is formed on, for example, the outer surface 20a of the mirror main body 20. As another example, the light transmission region 22 may have a structure in which no light reflection film is formed on the outer surface 20a of the mirror main body 20 and almost all the exterior light is transmitted in a state in which the glass or the resin layer is exposed. The light transmission region 22 has, for example, a rectangular shape as viewed from the axis direction of a reflection optical axis AX1 of the light reflection region 21, and is formed in a range wider than a visual field F of the imaging unit 40 described later. The light transmission region 22 having a rectangular shape reduces discomfort in appearance.

In the casing 12 of the housing 10, the nozzle 15 is provided on the inner surface side of the edge portion 12a. The nozzle 15 ejects fluid, such as cleaning liquid and air, to the light transmission region 22. The nozzle 15 enables cleaning of the light transmission region 22.

The mirror drive unit 30 adjusts the position of the mirror main body 20. The mirror drive unit 30 is disposed inside the housing 10. The mirror drive unit 30 includes a drive source and a transmission mechanism, and is capable of changing the position of the mirror main body 20 and changing the direction of the reflection optical axis AX1 of the light reflection region 21 by transmitting the driving force of the drive source to the mirror main body 20 with the transmission mechanism. The mirror drive unit 30 is capable of rotating the mirror main body 20 in a certain movable range, for example, in each of the direction around a vertical axis AXV and the direction around a horizontal axis AXH. This structure allows the reflection optical axis AX1 of the light reflection region 21 to be directed in a desired direction, by combining adjustment in the direction around the vertical axis AXV and adjustment in the direction around the horizontal axis AXH. The vertical axis AXV is a virtual straight line parallel to the vertical direction. The horizontal axis AXH is a virtual straight line orthogonal to each of the vertical axis AXV and the reflection optical axis AX1 of the light reflection region 21.

The imaging unit 40 images the rear of the vehicle M via the light transmission region 22. The image imaged with the imaging unit 40 is displayed on a display unit (not illustrated) in the vehicle M. For example, a CMOS camera or the like is used as the imaging unit 40. In the present embodiment, the imaging unit 40 is fixed inside the housing 10 and, for example, fixed on an inner surface 20b of the mirror main body 20 facing the inside of the housing 10. When the position of the mirror main body 20 is changed with the mirror drive unit 30, the imaging unit 40 is moved as one unitary piece together with change of the position of the mirror main body 20. A space between the imaging unit 40 and the mirror main body 20 is sealed with a light shield portion 14. The light shield portion 14 is provided to surround the light transmission region 22, fixes the imaging unit 40 on the inner surface 20b of the mirror main body 20, and shields light going from the space between the edge portion 12a and the mirror main body 20 toward the imaging unit 40 described later.

Figure 11:
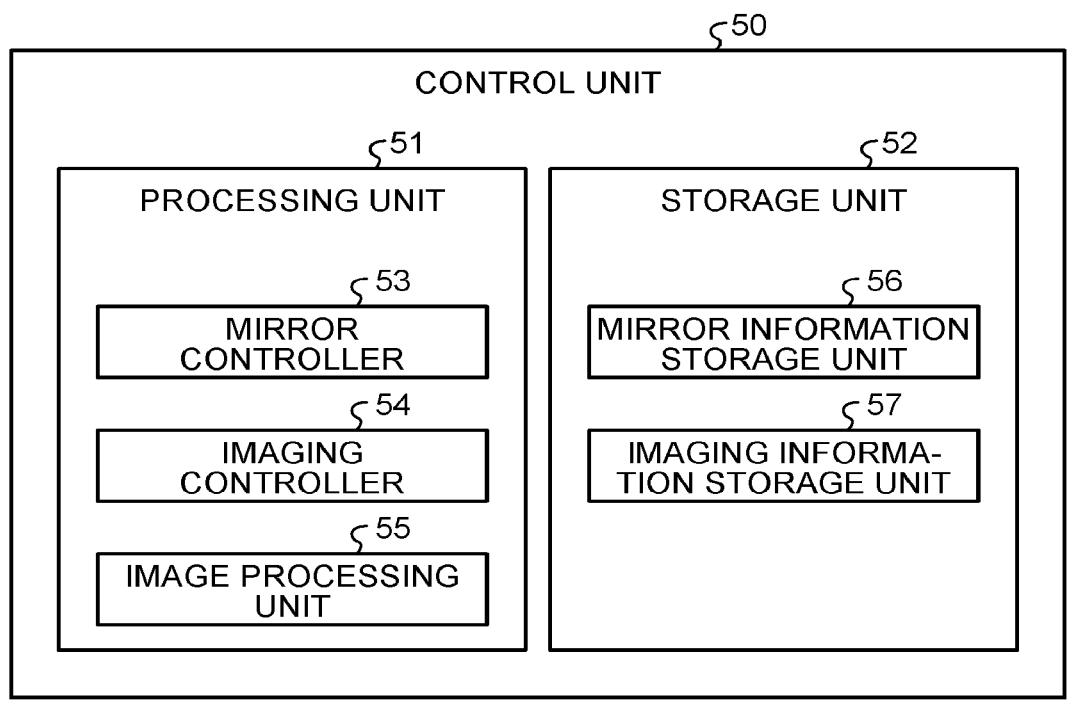
FIG. 11 is a block diagram illustrating an example of a control unit.

The control unit 50 comprehensively controls operations of the door mirror device 100A. The control unit 50 controls, for example, operations of the housing 10, the nozzle 15, the mirror drive unit 30, and the imaging unit 40 described above. FIG. 11 is a block diagram illustrating an example of the control unit 50. As illustrated in FIG. 11, the control unit 50 includes a processing unit 51 and a storage unit 52. The processing unit 51 includes a mirror controller 53, an imaging controller 54, and an image processing unit 55. The processing unit 51 may include a nozzle drive unit (not illustrated) driving the nozzle 15.

The mirror controller 53 controls operations of the mirror drive unit 30 by outputting a control signal to the mirror drive unit 30. For example, when an operation to change the position of the mirror main body 20 is input from the vehicle M by the driver or the like, the mirror controller 53 outputs a control signal corresponding to the operation.

The imaging controller 54 controls operations of the imaging unit 40 by outputting a control signal to the imaging unit 40. For example, when an operation to operate the electrical system of the vehicle M is input by the driver's operation or the like, the imaging controller 54 outputs a control signal. In a case where the electrical system of the vehicle M operates, the imaging controller 54 may output a control signal to the imaging unit 40, even when the engine of the vehicle M is not started up.

Figure 12:
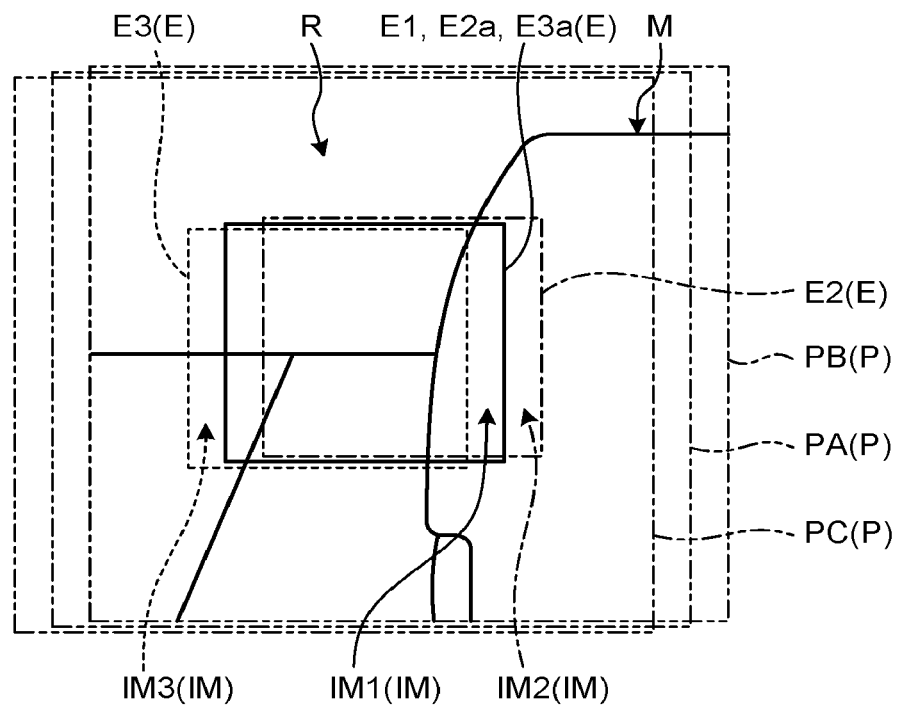
FIG. 12 is a diagram illustrating an example of a captured image and an extracted region.

FIG. 12 is a diagram illustrating an example of the captured image and an extracted region. FIG. 12 illustrates the captured image imaged with the imaging unit 40 mounted on the left door mirror device 100A as an example, but a similar explanation can be applied to the captured image imaged with the imaging unit 40 mounted on the right door mirror device 100A. As illustrated in FIG. 12, the captured image P is an image obtained by inverting, in the left-right direction, an image obtained by imaging an imaging object in the visual field F of the imaging unit 40. For example, the captured image P includes part of the vehicle M and a rear scene R of the rear of the vehicle M.

The image processing unit 55 extracts and outputs an extracted image IM included in an extraction region E, in the captured image P imaged with the imaging unit 40. The output extracted image IM is displayed on the display unit DP of the vehicle M. Specifically, the image displayed on the display unit DP is part of the captured image P imaged with the imaging unit 40. For example, in the initial state (the case where the power source system of the vehicle M is started first), the image processing unit 55 sets the extraction region E in a certain position, such as the center of the captured image P. When the power source system is started up for the second time or the subsequent time, the image processing unit 55 sets the extraction region E in the last position set at the previous startup or startup before the previous one. The position of the extraction region E is configured to be changeable by, for example, the driver's operation on the operating unit in the vehicle M from the startup state of the power source system. When the position of the extraction region E is operated with the operating unit, the image processing unit 55 sets the extraction region E at the position corresponding to the operation content. When the setting of the extraction region E is updated, the imaging controller 54 calculates a visual field portion (F1 to F3 described later) corresponding to the extraction region E in the visual field F of the imaging unit 40. The details of operations of the imaging controller 54 and the image processing unit 55 will be described later.

The storage unit 52 includes a mirror information storage unit 56 and an imaging information storage unit 57. The mirror information storage unit 56 stores therein information relating to the position of the mirror main body 20 and the like. For example, the mirror information storage unit 56 stores therein an inclination angle between the reflection optical axis AX1 and a certain reference direction for each of the directions around the vertical axis AXV and the horizontal axis AXH. For example, the certain reference direction may be set to the direction along the reflection optical axis AX1 in the case where the mirror main body 20 is located in the initial position. In this case, the initial position is such a position that the mirror main body 20 is disposed in the intermediate position of the movable range in each of the directions around the vertical axis AXV and the horizontal axis AXH.

When the position of the mirror main body 20 is changed with the mirror drive unit 30, the mirror information storage unit 56 stores therein the rotation direction and the rotation quantity in the direction around the vertical axis AXV and the rotation direction and the rotation quantity in the direction around the horizontal axis AXH. On the basis of these pieces of information, the mirror information storage unit 56 can calculate, for example, in which direction and by what angle the mirror main body 20 is inclined with respect to the reference direction in each of the directions around the vertical axis AXV and the horizontal axis AXH. The mirror information storage unit 56 may store the calculated inclination directions and the inclination angles.

The imaging information storage unit 57 stores therein information relating to imaging with the imaging unit 40. The imaging information storage unit 57 stores therein, for example, data of the captured image imaged with the imaging unit 40. The imaging information storage unit 57 also stores therein the position of the extraction region set in the captured image. In this case, for example, the imaging information storage unit 57 is capable of storing therein the captured image in a state in which plane coordinates are set, and storing therein the extraction region with coordinate values in the plane coordinates. The imaging information storage unit 57 also stores therein the position in the visual field F of the imaging unit 40 and the position in the captured image in association with each other with a data table or the like. In this case, the position in the visual field F of the imaging unit 40 can be defined by, for example, the angles in the directions around the vertical axis and the horizontal axis with reference to the imaging optical axis AX2. The imaging information storage unit 57 also stores therein, for example, relation between the rotation direction and the rotation quantity of the mirror main body 20 and the moving directions and the moving quantities of the imaging optical axis AX2, the visual field F, and the visual field portion F1 in association with each other with a data table or the like.

Figure 13:
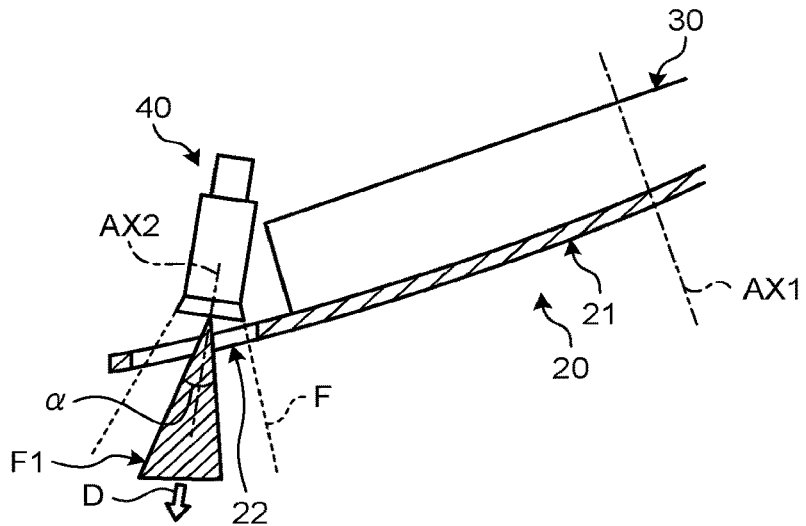
FIG. 13 is a diagram illustrating relation between a visual field of the imaging unit and a visual field portion corresponding to the extracted region.
Figure 14:
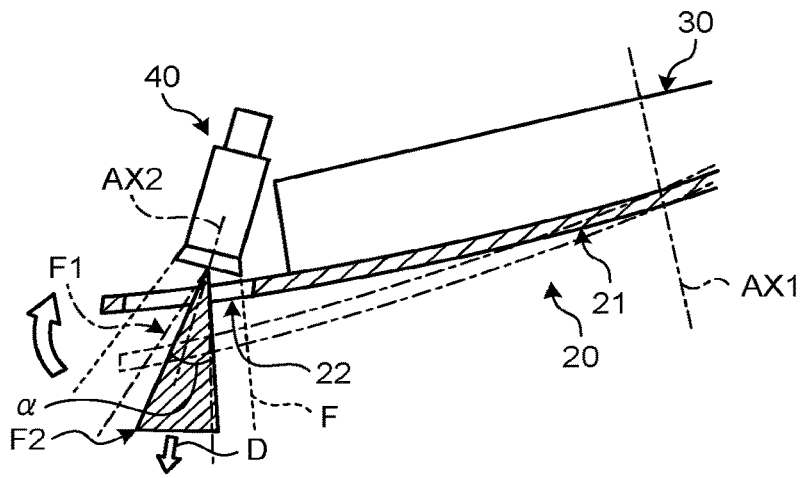
FIG. 14 is a diagram illustrating relation between the visual field of the imaging unit and the visual field portion corresponding to the extracted region.
Figure 15:
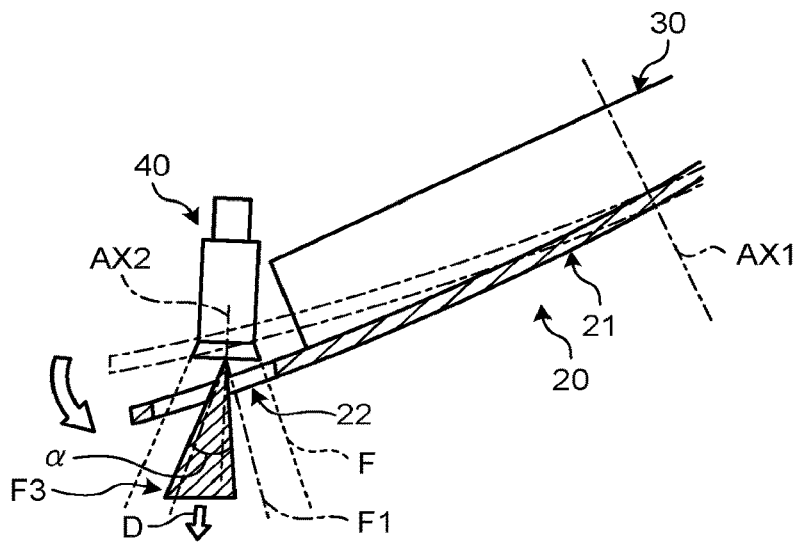
FIG. 15 is a diagram illustrating relation between the visual field of the imaging unit and the visual field portion corresponding to the extracted region.
Figure 16:
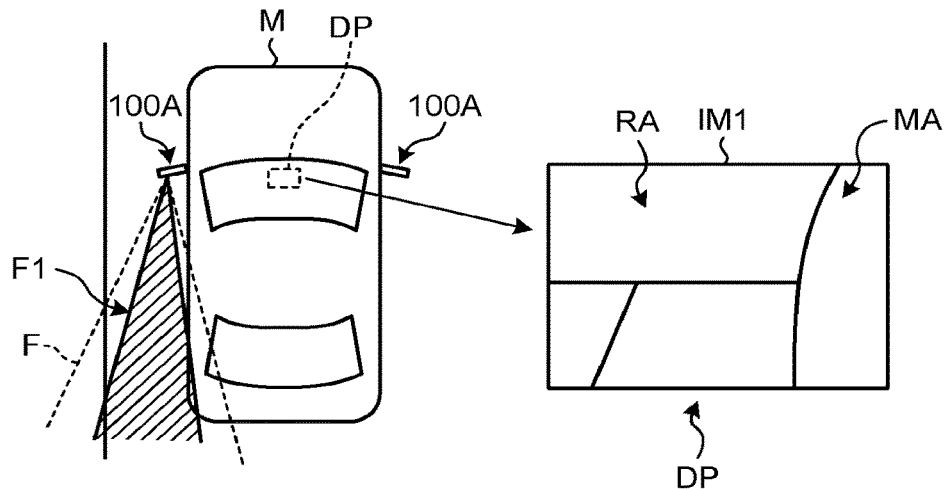
FIG. 16 is a diagram illustrating an example of an image displayed on the display unit in the vehicle and an imaging range of the imaging unit corresponding to the image.
Figure 17:
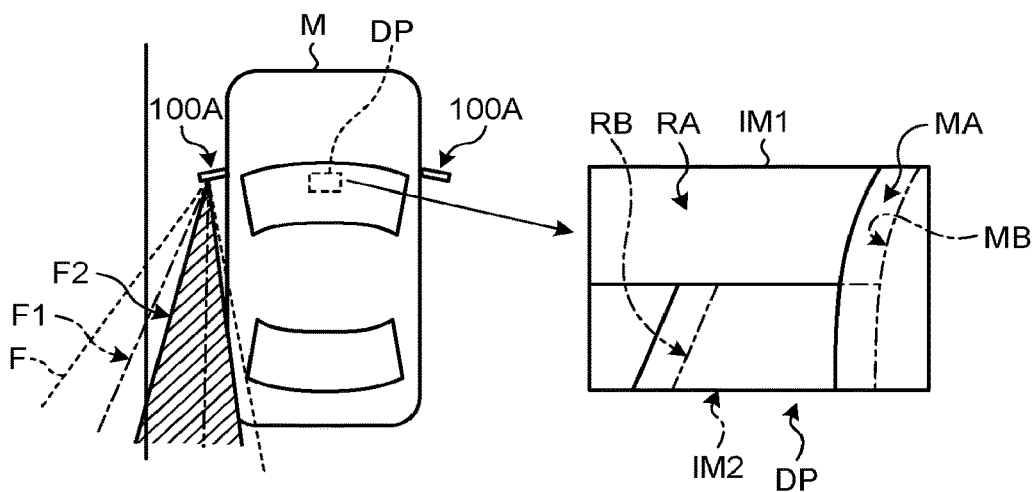
FIG. 17 is a diagram illustrating an example of an image displayed on the display unit in the vehicle and an imaging range of the imaging unit corresponding to the image.
Figure 18:
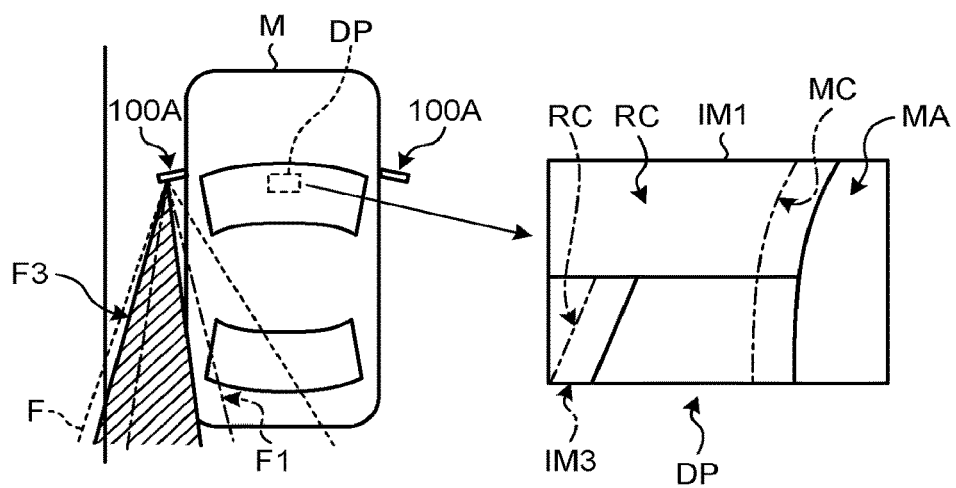
FIG. 18 is a diagram illustrating an example of an image displayed on the display unit in the vehicle and an imaging range of the imaging unit corresponding to the image.

FIG. 13 to FIG. 15 are diagrams illustrating relation between the visual field F of the imaging unit 40 and the visual field portion corresponding to the extraction region E. FIG. 16 to FIG. 18 are diagrams illustrating examples of the extracted image IM displayed on the display unit in the vehicle M and the imaging range of the imaging unit 40 corresponding to the extracted image IM. The following explanation illustrates the case of changing the position of the mirror main body 20 by rotating the mirror main body 20 around the vertical axis AXV with the mirror drive unit 30.

FIG. 13 and FIG. 16 illustrate a state before the position of the mirror main body 20 is changed. As illustrated in FIG. 13 and FIG. 16, the visual field F of the imaging unit 40 includes a visual field portion F1 corresponding to the extraction region E1. When the extraction region E1 is set in the captured image PA by the driver or the like, the imaging controller 54 calculates a visual field portion (first visual field portion) F1 corresponding to the extraction region E1 in the visual field F of the imaging unit 40. In this case, the imaging controller 54 is enabled to easily calculate the visual field portion F1 corresponding to the extraction region E1 by using, for example, the data table stored in the imaging information storage unit 57. The imaging controller 54 stores the calculated results in the imaging information storage unit 57 of the storage unit 52. In this case, the direction with respect to the imaging unit 40 and the angle range of the visual field portion F1 are, for example, the direction D and the angle range a.

FIG. 14 and FIG. 17 illustrate the case where the mirror main body 20 is rotated, with the mirror drive unit 30, in one (clockwise direction as viewed from above) of the directions around the vertical direction AXV from the state illustrated in FIG. 13 and FIG. 16. As illustrated in FIG. 14 and FIG. 17, with change of the position of the mirror main body 20, the imaging unit 40 fixed on the mirror main body 20 is moved as one unitary piece with the mirror main body 20 in the clockwise direction. With the movement of the imaging unit 40, the imaging optical axis AX2, the visual field F, and the visual field portion F1 are moved. For this reason, the captured image PB imaged with the imaging unit 40 and the extraction region E2 change from the captured image PA and the extraction region E1 before change (see FIG. 12). In this state, as illustrated in FIG. 17, an extracted image IM2 in a state of being shifted in one direction (for example, rightward in the horizontal direction) from the extraction image IM1 before position change is displayed on the display unit DP of the vehicle M. Specifically, in the extracted image IM2, vehicle part MB and a rear state RB are shifted to the right side in the horizontal direction from the vehicle part MA and the rear state RA.

For this reason, when the position of the mirror main body 20 is changed with the mirror drive unit 30, the imaging controller 54 acquires information relating to the adjustment direction and the adjustment quantity of the position of the mirror main body 20 with the mirror drive unit 30 from the mirror information storage unit 56. The imaging controller 54 calculates the movement directions and the movement quantities of the imaging optical axis AX2, the visual field F, and the visual field portion F1, on the basis of the acquired adjustment direction and the adjustment quantity. For example, the storage unit 52 may store therein the relation between a set of the adjustment direction and the adjustment quantity of the position of the mirror main body 20 and a set of the movement directions and the movement quantities of the imaging optical axis AX2, the visual field F, and the visual field portion F1 as a data table. With this, the imaging controller 54 is enabled to easily calculate the movement directions and the movement quantities of the imaging optical axis AX2, the visual field F, and the visual field portion F1, on the basis of the adjustment direction and the adjustment quantity of the position of the mirror main body 20.

On the basis of the calculation results, the imaging controller 54 calculates a visual field portion (second visual field portion) F2 having the same direction with respect to the imaging unit 40 and the same angle range as those (direction D and angle range a illustrated in FIG. 13) of the visual field portion F1 before change of the position of the mirror main body 20, in the visual field F after position change. For example, as the visual field portion F2, the imaging controller 54 calculates a visual field portion in a position obtained by returning, in the calculated movement direction by the movement quantity, the position of the visual field portion F1 in the visual field F after position change.

The image processing unit 55 sets, as the extraction region E2a, a region corresponding to the calculated visual field portion F2 in the captured image PB. The extraction region E2a is a region corresponding to the visual field portion F2. The visual field portion F2 has the same direction with respect to the imaging unit 40 and the same angle range as those of the visual field portion F1 before position change. For this reason, the extraction region E2a agrees with the extraction region E1 corresponding to the visual field portion F1. The image included in the extraction region E2a is the same image as the extracted image IM1. For this reason, the display unit DP of the vehicle M displays the same image as the extracted image IM before position change.

FIG. 15 and FIG. 18 illustrate the case where the mirror main body 20 is rotated with the mirror drive unit 30 in the other (counterclockwise direction as viewed from above) direction around the vertical axis AXV from the state illustrated in FIG. 13. Also in the case illustrated in FIG. 15 and FIG. 18, with change of the position of the mirror main body 20, the imaging unit 40 fixed on the mirror main body 20 is moved as one unitary piece with the mirror main body 20, and the imaging optical axis AX2, the visual field F, and the visual field portion F1 are moved. For this reason, a captured image PC imaged with the imaging unit 40 and the extraction region E3 change from the captured image PA and the extraction region E1 before change (see FIG. 12). In this state, as illustrated in FIG. 18, an extracted image IM3 in a state of being shifted in the other direction (for example, leftward in the horizontal direction) from the extraction image IM1 before position change is displayed on the display unit DP of the vehicle M. Specifically, in the extracted image IM3, vehicle part MC and a rear state RC are shifted to the left side in the horizontal direction from the vehicle part MA and the rear state RA.

For this reason, when the position of the mirror main body 20 is changed with the mirror drive unit 30, the imaging controller 54 acquires information relating to the adjustment direction and the adjustment quantity of the position of the mirror main body 20 with the mirror drive unit 30 from the mirror information storage unit 56. The imaging controller 54 calculates the movement directions and the movement quantities of the imaging optical axis AX2, the visual field F, and the visual field portion F1, on the basis of the acquired adjustment direction and the adjustment quantity.

On the basis of the calculation results, the imaging controller 54 calculates a visual field portion (second visual field portion) F3 having the same direction with respect to the imaging unit 40 and the same angle range as those (direction D and angle range a) of the visual field portion F1 before change of the position of the mirror main body 20, in the visual field F after position change. For example, as the visual field portion F3, the imaging controller 54 calculates a visual field portion in a position obtained by returning, in the calculated movement direction by the movement quantity, the position of the visual field portion F1 in the visual field F after position change.

The image processing unit 55 sets, as the extraction region E3a, a region corresponding to the determined visual field portion F3 in the captured image PC. The extraction region E3a is a region corresponding to the visual field portion F3. The visual field portion F3 has the same direction with respect to the imaging unit 40 and the same angle range as those of the visual field portion F1 before position change. For this reason, the extraction region E3a agrees with the extraction region E1 corresponding to the visual field portion F1. The image included in the extraction region E3a is the same image as the extracted image IM1. For this reason, the display unit DP of the vehicle M displays the same image as the extracted image IM before position change.

Figure 19:
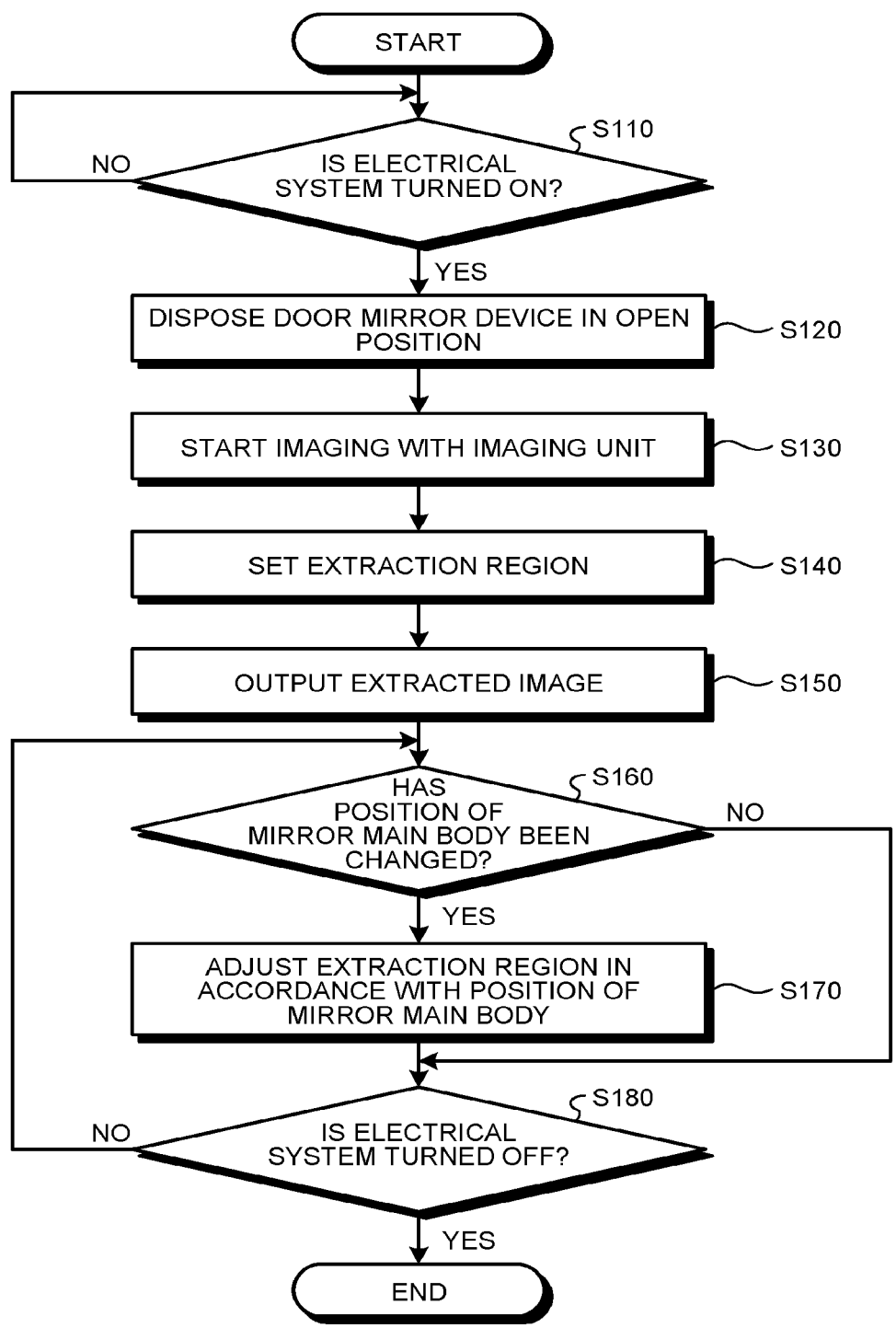
FIG. 19 is a flowchart illustrating an example of a method for controlling the outer mirror device.

The following is an explanation of the method for controlling the door mirror device 100A configured as described above. FIG. 19 is a flowchart illustrating an example of the method for controlling the door mirror device 100A. As illustrated in FIG. 19, when the electrical system of the vehicle M is turned on by the driver (Step S110), the mirror controller 53 of the control unit 50 causes the door mirror device 100A to be disposed in the open position (Step S120).

When the door mirror device 100A is disposed in the open position, the imaging controller 54 causes the imaging unit 40 to start imaging (Step S130). The imaging unit 40 images the object in the visual field F, and a captured image P is acquired. The imaging unit 40 stores the acquired captured image P in the imaging information storage unit 57 of the storage unit 52.

After the captured image P is acquired, the image processing unit 55 sets the extraction region E (Step S140). For example, in the initial state, the image processing unit 55 sets the extraction region E in a certain position, such as the center of the captured image P; and in the second or subsequent startup, the image processing unit 55 sets the extraction region E in the last position set in the previous startup or the startup before the previous startup. In addition, when the driver operates the operating unit in the vehicle M to change the position of the extraction region E, the image processing unit 55 sets the extraction region E in a position changed by the operation. After the extraction region E is set, the image processing unit 55 outputs an extracted image IM included in the extraction region E (Step S150).

Thereafter, the control unit 50 detects whether the position of the mirror main body 20 has been changed (Step S160). At Step S160, the control unit 50 detects that the position of the mirror main body 20 has been changed, by detecting a control signal transmitted from the mirror controller 53 to the mirror drive unit 30. When the control unit 50 detects change of the position of the mirror main body 20 (Yes at Step S160), the control unit 50 adjusts the extraction region E in accordance with the position of the mirror main body 20 (Step S170). At Step S170, the imaging controller 54 acquires information relating to the adjustment direction and the adjustment quantity of the position of the mirror main body 20 from the mirror information storage unit 56, and calculates movement directions and movement quantities of the imaging optical axis AX2, the visual field F, and the visual field portion F1 on the basis of the acquired result. In addition, the imaging controller 54 sets, as visual field portions F2 and F3, visual field portions in positions each obtained by returning, in the calculated movement directions by the movement quantities, the position of the visual field portion F1 in the visual field F after position change, on the basis of the calculation result.

The image processing unit 55 sets, as extraction regions E2a and E3a, regions corresponding to the calculated visual field portions F2 and F3 in the captured image P. Images included in the extraction regions E2a and E3a are the same image as the extracted image IM1. Accordingly, even when the position of the mirror main body 20 changes, the display unit DP of the vehicle M displays the same image as the extracted image IM before position change.

When no change of position of the mirror main body 20 is detected at Step S160 (No at Step S160) or adjustment at Step S170 has been performed, the control unit 50 performs the processing at Step S160 and subsequent steps repeatedly, unless the electrical system of the vehicle M is turned off (No at Step S180). When the electrical system of the vehicle M is turned off (Yes at Step S180), the control unit 50 ends the process.

As described above, the door mirror device 100A according to the present embodiment includes: the housing 10 attached to the door DL or DR of the vehicle M and including the opening 10a facing the rear of the vehicle M; the mirror main body 20 disposed in the opening 10a of the housing 10 and having the light reflection region 21 reflecting light entering from the outside of the housing 10 and the light transmission region 22 capable of transmitting the light to the inside of the housing 10; the mirror drive unit 30 disposed inside the housing 10 and configured to adjust the position of the mirror main body 20; the imaging unit 40 fixed on the inner surface 20b of the mirror main body 20 and imaging the rear of the vehicle M through the light transmission region 22, the inner surface 20b facing the inside of the housing 10; and the control unit 50 configured to extract and output the extracted image IM included in the certain extraction region E in the captured image P imaged with the imaging unit 40, and adjust the position of the extraction region E in the captured image P in accordance with the position of the mirror main body 20.

The method for controlling the door mirror device 100A according to the present embodiment is a method for controlling the door mirror device 100A that includes: the housing 10 attached to the door DL or DR of the vehicle M and including the opening 10a facing the rear of the vehicle M; the mirror main body 20 disposed in the opening 10a of the housing 10 and having the light reflection region 21 reflecting light entering from the outside of the housing 10 and the light transmission region 22 capable of transmitting the light to the inside of the housing 10; the mirror drive unit 30 disposed inside the housing 10 and adjusting the position of the mirror main body 20; and the imaging unit 40 fixed on the inner surface 20b of the mirror main body 20 and imaging the rear of the vehicle M through the light transmission region 22, the inner surface 20b facing the inside of the housing 10. The method includes: extracting and outputting the extracted image IM included in the certain extraction region E in the captured image P imaged with the imaging unit 40; and adjusting the position of the extraction region E in the captured image P in accordance with the position of the mirror main body 20.

With this structure, because the control unit 50 adjusts the position of the extraction region E in the captured image P in accordance with the position of the mirror main body 20, the imaging direction of the imaging unit 40 is automatically adjusted by adjusting the position of the mirror main body 20. This structure enables reduction in labor in adjustment of the position of the mirror main body 20 and the imaging direction of the imaging unit 40, and enables an image in a range a driver wishes to view to be displayed on the display unit DP.

In the door mirror device 100A according to the present embodiment, the control unit 50 adjusts the position of the extraction region E in accordance with the adjustment direction and the adjustment quantity of the position of the mirror main body 20 with the mirror drive unit 30. This structure enables linking of the position change of the mirror main body 20 to the position of the extraction region E by adjusting the position of the extraction region E using the adjustment direction and the adjustment quantity adjusted with the mirror drive unit 30.

The door mirror device 100A according to the present embodiment further includes the storage unit 52 configured to store therein the adjustment direction and the adjustment quantity, and the control unit 50 adjusts the position of the extraction region E on the basis of the adjustment direction and the adjustment quantity stored in the storage unit 52. This structure enables easy acquisition of information relating to position change of the mirror main body 20, because the adjustment direction and the adjustment quantity stored in the storage unit 52 can be used.

In the door mirror device 100A according to the present embodiment, when the position of the mirror main body 20 is changed with the mirror drive unit 30, the control unit 50 calculates the direction with respect to the imaging unit 40 and the angle range of the visual field portion F1 corresponding to the extraction region E in the visual field F of the imaging unit 40 before change, and sets a region on the captured image P corresponding to the visual field portion F2 having the same direction with respect to the imaging unit 40 and the same angle range as those of the calculation result in the field F of the imaging unit 40 after change, as the extraction region E. This structure maintains the image included in the extraction region E as the same image before and after change of the mirror main body 20.

In the door mirror device 100A according to the present embodiment, the control unit 50 calculates the movement direction and the movement quantity of the visual field F of the imaging unit 40 on the basis of the adjustment direction and the adjustment quantity of the position of the mirror main body 20 with the mirror drive unit 30, and calculates the visual field portion F2 on the basis of the calculation result. This structure enables easy calculation of the visual field portion F2 by using the details of adjustment of the position of the mirror main body 20.

In the door mirror device 100A according to the present embodiment, the extracted image IM is an image displayed on the display unit DP of the vehicle M. This structure enables reduction in labor in adjustment of the image displayed on the display unit DP.

The second embodiment illustrates the case where the direction of the imaging unit 40 is changed by rotating the mirror main body 20 around the vertical axis AXV, as an example, but the structure is not limited thereto. For example, a similar explanation can be applied to the case where the direction of the imaging unit 40 is changed by rotating the mirror main body 20 in the direction around the horizontal axis AXH. Accordingly, in the door mirror device 100A according to the present embodiment, when the mirror main body 20 is rotated in a direction around at least one of the vertical axis AXV and the horizontal axis AXH, the control unit 50 is enabled to adjust the position of the extraction region E in the captured image P. For this reason, the imaging direction of the imaging unit 40 is automatically adjusted by adjusting the position of the mirror main body 20. This structure enables reduction in labor in adjustment of the position of the mirror main body 20 and the imaging direction of the imaging unit 40.

In addition, in the door mirror device 100A according to the second embodiment, when the shift lever provided in the vehicle M is shifted to the reverse gear, the control unit 50 is capable of controlling the mirror drive unit 30 to rotate the mirror main body 20 downward in the vehicle mounted state. By the control, the mirror main body 20 is rotated downward by a certain angle by drive with the mirror drive unit 30. This structure secures a visual field effective for moving the vehicle backward.

Figure 20:
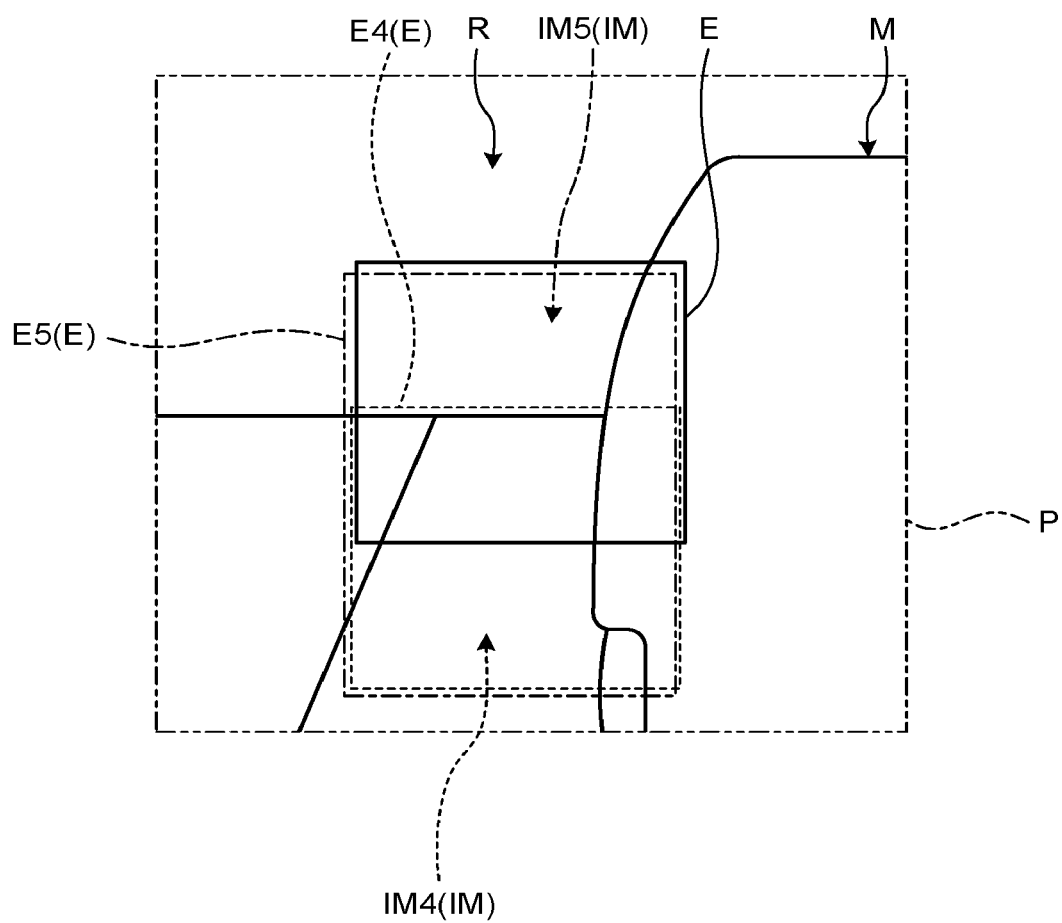
FIG. 20 is a diagram illustrating another example of the captured image and the extracted region.

In this operation, as illustrated in FIG. 20, the image processing unit 55 may extract, from the captured image P, an extraction region E4 corresponding to a visual field portion effective for the case of moving the vehicle backward. In this case, the image processing unit 55 is capable of displaying an extracted image IM4 included in the extraction region E4 on the display unit DP of the vehicle M, with movement of the mirror main body 20. The position and the range of the extraction region E4 can be calculated with the imaging controller 54 on the basis of the movement quantity and the movement direction of the imaging unit 40 moving as one unitary piece with the mirror main body 20.

As an extraction region corresponding to the visual field portion effective for the case of moving the vehicle backward, the present embodiment illustrates the case where the image processing unit 55 sets the extraction region E4 having, for example, the same size as that of the extraction region E just before the shift lever is shifted and located in a position obtained by shifting the extraction region E downward, but the structure is not limited thereto. As an extraction region corresponding to the visual field portion effective for the case of moving the vehicle backward, the image processing unit 55 may extract, for example, an extraction region E5 obtained by expanding the extraction region E1 downward. In this case, because the display unit DP displays an image including the extraction region E1 and a region under the extraction region E1, a wide visual field can be secured when the driver moves the vehicle backward.

In the structure in which the shift lever and the mirror main body 20 are not moved in a linked manner, for example, when the shift lever is shifted to the reverse gear, the image processing unit 55 may extract the extraction region E4 or the extraction region E5 without rotating the mirror main body 20 to display the extracted image IM4 or the extracted image IM5 on the display unit DP.

Third Embodiment

Figure 21:
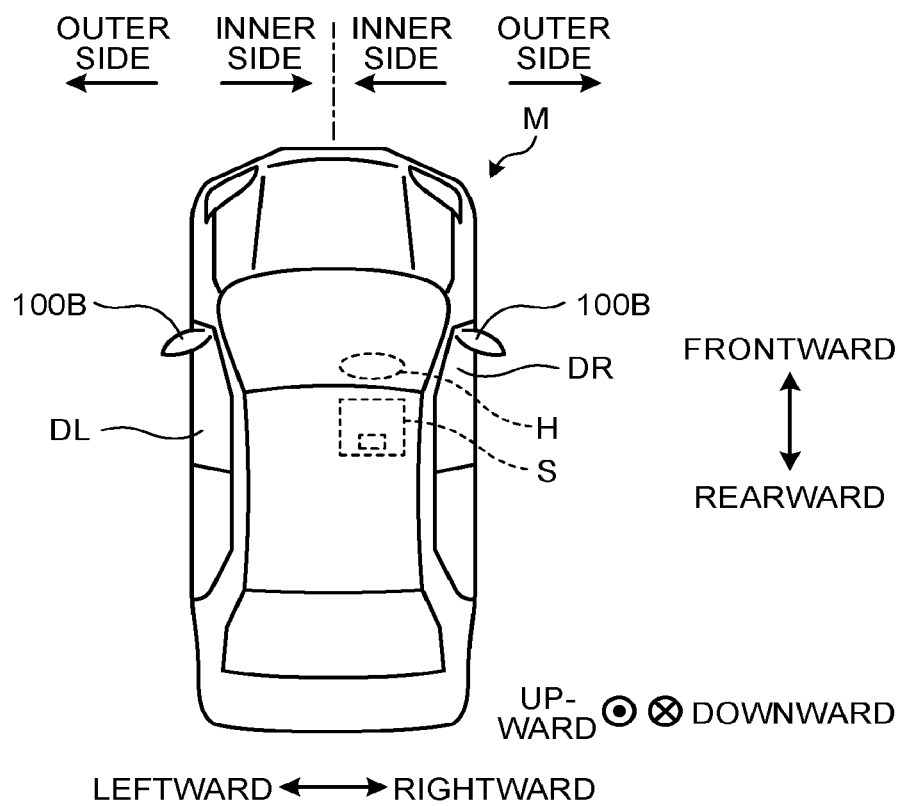
FIG. 21 is a plan view illustrating an example of a vehicle including an outer mirror device according to a third embodiment.

FIG. 21 is a plan view illustrating an example of a vehicle M including door mirror devices 100 according to a third embodiment. The door mirror devices 100 are attached to the left door DL and the right door DR of the vehicle M. The left and the right door mirror devices 100 are substantially symmetrical in the left-right direction. In the present embodiment, a vehicle in which a steering wheel H is disposed on the right seat (driver's seat) S is illustrated as an example of the vehicle M.

Figure 22:
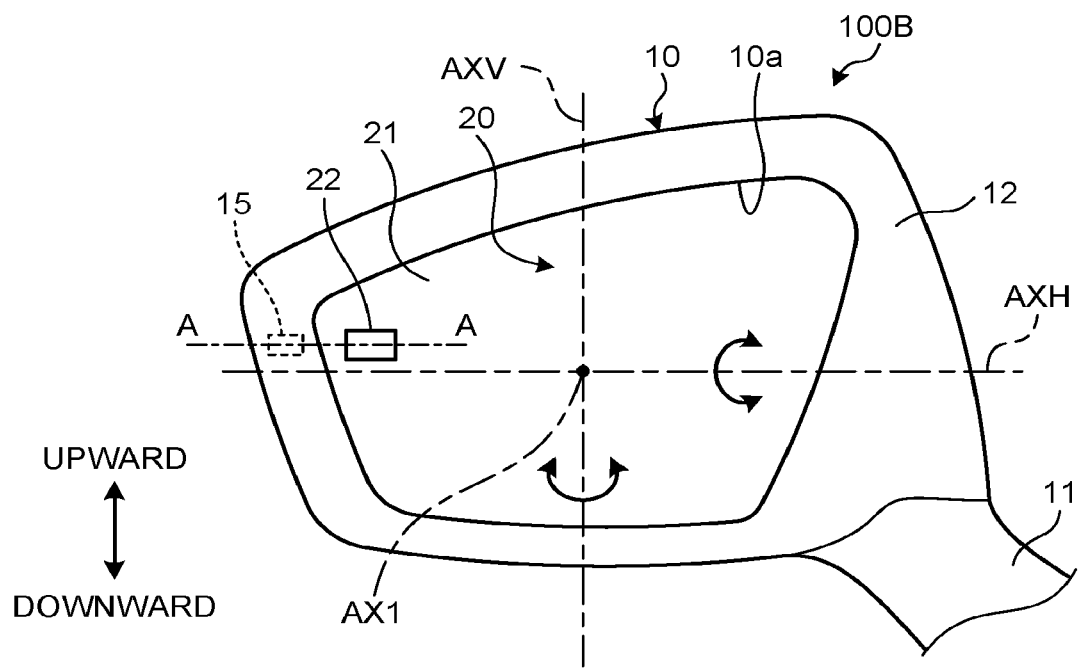
FIG. 22 is a diagram illustrating an example of the outer mirror device.
Figure 23:
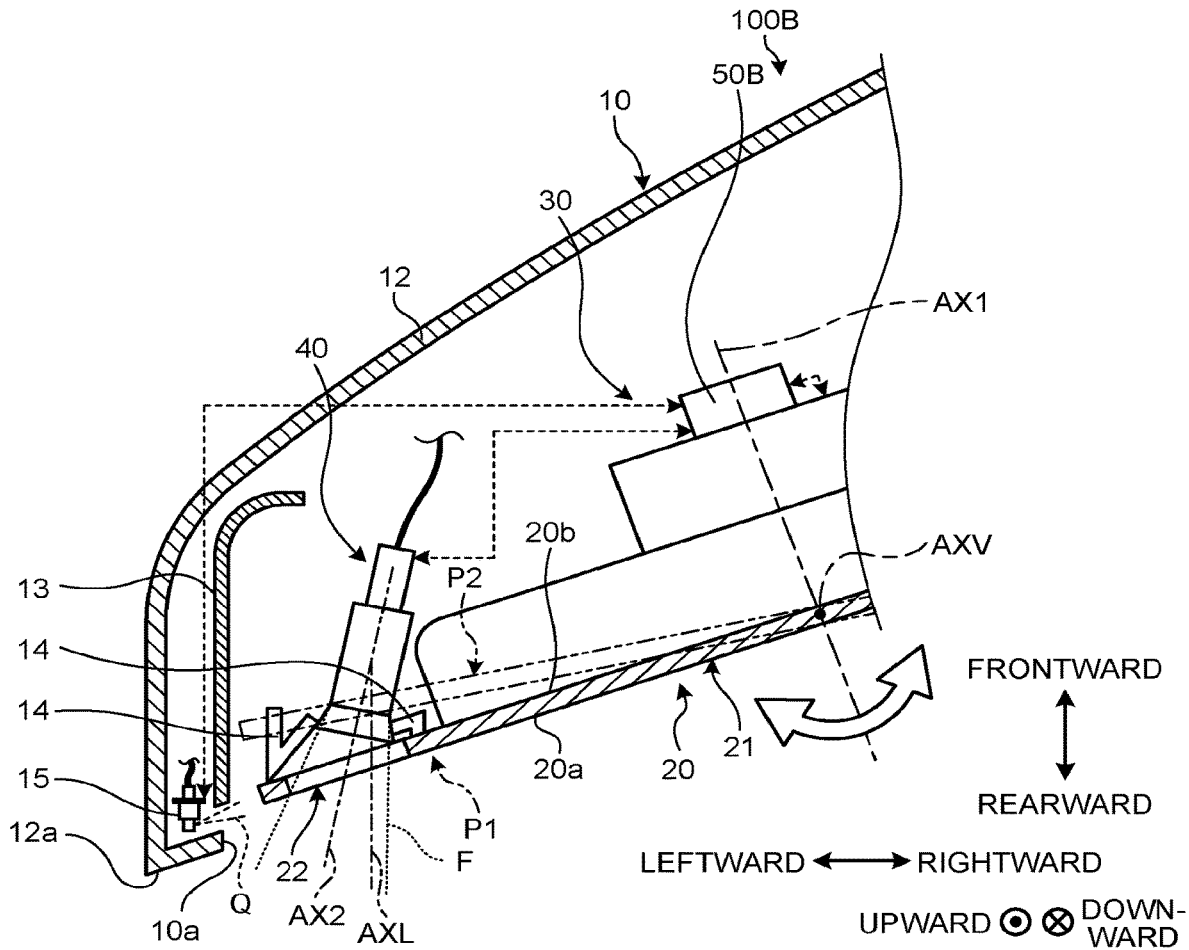
FIG. 23 is a diagram illustrating a structure along an A-A cross section in FIG. 22.

FIG. 22 is a diagram illustrating an example of the door mirror device 100. FIG. 22 illustrates a left door mirror device 100. FIG. 23 is a diagram illustrating a structure along an A-A cross section in FIG. 22, and illustrates the inner structure of the left door mirror device 100. As illustrated in FIG. 22 and FIG. 23, the door mirror device 100 includes a housing 10, a mirror main body 20, a mirror drive unit 30, an imaging unit 40, and a control unit 50B. The right door mirror device 100 has a structure similar to and horizontally symmetrical with that of the left door mirror device 100, and a similar explanation can be applied thereto.

The housing 10 is attached to the left door DL or the right door DR of the vehicle M. The housing 10 includes a base portion 11, a casing 12, and an inner wall portion 13. The base portion 11 is fixed on the left door DL or the right door DR. The casing 12 is connected with the base portion 11. The casing 12 is provided rotatably with respect to an axis (vertical axis) perpendicular to the vertical direction, with a rotation drive source (not illustrated). The casing 12 is rotatable between an open position (position illustrated in FIG. 21 and FIG. 22 and the like) in which the door mirror device 100 is in an opened state and a closed position in which the door mirror device 100 is in a closed state. The casing 12 includes an edge portion 12a. The edge portion 12a has an annular shape, and forms an opening 10a of the housing 10. The opening 10a faces the rear of the vehicle M, in a state in which the door mirror device 100 is disposed in the open position. The inner wall portion 13 is provided along a wall portion located on the outer side of the vehicle M inside the casing 12.

The mirror main body 20 is formed in a plate shape using, for example, glass or resin. The mirror main body 20 is disposed in the opening 10a of the housing 10. The mirror main body 20 is supported with the housing 10 via the mirror drive unit 30. The mirror main body 20 has a light reflection region 21 and a light transmission region 22. The light reflection region 21 is formed by depositing metal, such as aluminum and silver, on an outer surface 20a side, for example, facing the outside of the housing 10 in the mirror main body 20. The light reflection region 21 reflects light entering from the outside of the housing 10. The light reflection region 21 is provided over substantially the whole part other than the region provided with the light transmission region 22 described below.

The light transmission region 22 is provided on part of the outer surface 20a of the mirror main body 20, and capable of transmitting exterior light. The light transmission region 22 may have a structure in which a film reflecting part of exterior light and transmitting part of the exterior light, such as a semi-transmitting reflection film, is formed on, for example, the outer surface 20a of the mirror main body 20. As another example, the light transmission region 22 may have a structure in which no light reflection film is formed on the outer surface 20a of the mirror main body 20 and almost all the exterior light is transmitted in a state in which the glass or the resin layer is exposed. The light transmission region 22 has, for example, a rectangular shape as viewed from the axis direction of a reflection optical axis AX1 of the light reflection region 21, and is formed in a range wider than a visual field F of the imaging unit 40 described later. The light transmission region 22 having a rectangular shape reduces discomfort in appearance.

The mirror drive unit 30 adjusts the position of the mirror main body 20. The mirror drive unit 30 is disposed inside the housing 10. The mirror drive unit 30 includes a drive source and a transmission mechanism, and is capable of changing the position of the mirror main body 20 and changing the direction of the reflection optical axis AX1 of the light reflection region 21 by transmitting the driving force of the drive source to the mirror main body 20 with the transmission mechanism.

The mirror drive unit 30 is capable of adjusting the position of the mirror main body 20 between a set position P1 and a cleaning position P2. The set position P1 is a position in which the mirror main body 20 can be set by, for example, operating the operating unit disposed in the vehicle M by the driver or the like. The cleaning position P2 is a position to perform cleaning on the light transmission region 22.

The mirror drive unit 30 is capable of rotating the mirror main body 20 in a certain movable range, for example, in each of the direction around a vertical axis AXV and the direction around a horizontal axis AXH. This structure allows the reflection optical axis AX1 of the light reflection region 21 to be directed in a desired direction, by combining adjustment in the direction around the vertical axis AXV and adjustment in the direction around the horizontal axis AXH. The vertical axis AXV is a virtual straight line parallel to the vertical direction. The horizontal axis AXH is a virtual straight line orthogonal to each of the vertical axis AXV and the reflection optical axis AX1 of the light reflection region 21.

The imaging unit 40 images the rear of the vehicle M via the light transmission region 22. The image imaged with the imaging unit 40 is displayed on a display unit (not illustrated) in the vehicle M. For example, a CMOS camera or the like is used as the imaging unit 40. In the present embodiment, the imaging unit 40 is fixed inside the housing 10 and, for example, fixed on an inner surface 20b of the mirror main body 20 facing the inside of the housing 10. When the position of the mirror main body 20 is changed with the mirror drive unit 30, the imaging unit 40 is moved as one unitary piece together with change of the position of the mirror main body 20. A space between the imaging unit 40 and the mirror main body 20 is sealed with a light shield portion 14. The light shield portion 14 is provided to surround the light transmission region 22, fixes the imaging unit 40 on the inner surface 20b of the mirror main body 20, and shields light going from the space between the edge portion 12a and the mirror main body 20 toward the imaging unit 40 described later.

Figure 24:
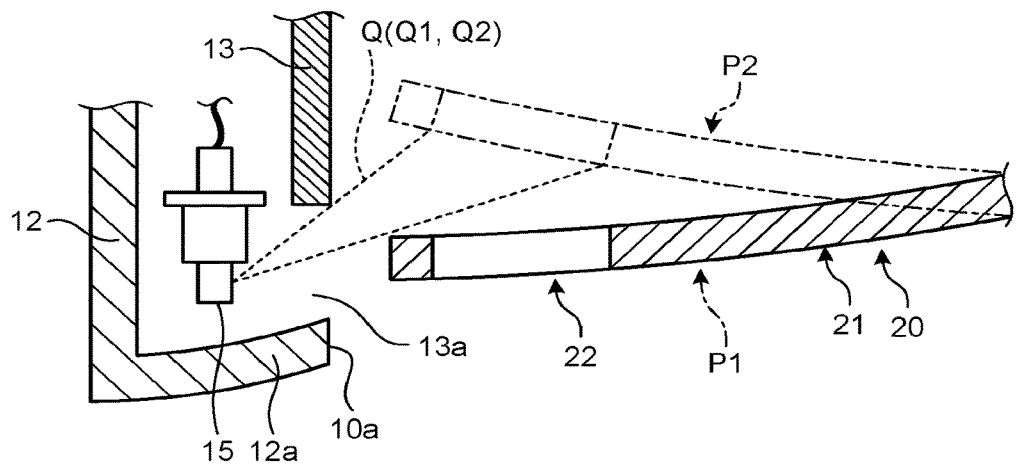
FIG. 24 is an enlarged view of part of the outer mirror device in FIG. 23.

FIG. 24 is an enlarged view of part of the door mirror device 100 in FIG. 23. FIG. 24 illustrates a structure of the edge portion 12a on the side on which the light transmission region 22 is disposed in the casing 12, and the vicinity thereof. As illustrated in FIG. 22 to FIG. 24, a nozzle 15 is provided on the inner surface side of the edge portion 12a, in the casing 12 of the housing 10. This disposition causes the nozzle 15 to be hard to see in appearance, and suppresses deterioration in appearance. In the state in which the door mirror device 100 is viewed in the axis direction of the reflection optical axis AX1, the nozzle 15 is disposed on the side of the mirror main body 20 (see FIG. 22). In the present embodiment, the nozzle 15 is disposed in a position on the outer side of the vehicle M with respect to the mirror main body 20.

The nozzle 15 ejects fluid Q from the position on the outer side of the vehicle M with respect to the mirror main body 20 toward the mirror main body 20 side via a gap 13a formed between the edge portion 12a and the rear end portion of the inner wall portion 13. Specifically, the nozzle 15 ejects fluid Q in a direction inclined forward with respect to the inner direction of the vehicle M. In the present embodiment, the nozzle 15 is capable of ejecting, for example, a liquid-state cleaning liquid Q1 and a gaseous cleaning gas Q2 in a switching manner, as the fluid Q.

The nozzle 15 may have a structure of simultaneously ejecting the cleaning liquid Q1 and the cleaning gas Q2. As another example, a nozzle to eject the cleaning liquid Q1 and a nozzle to eject the cleaning gas Q2 may be provided separately. As another example, the nozzle 15 may have a structure of ejecting either one of liquid fluid and gaseous fluid.

In the case of ejecting the cleaning liquid Q1 as the fluid Q from the nozzle 15, examples of the supply source of the cleaning liquid Q1 includes a tank of a cleaning liquid to clean windshield wipers (not illustrated) or the like in the vehicle M. In this case, as a path to supply the cleaning liquid contained in the tank, a path to independently supply the cleaning liquid contained in the tank to the nozzle 15 may be provided separately from the path of the cleaning liquid in cleaning of the windshield wipers or the like. In addition, in the case of ejecting the cleaning gas Q2 as the fluid Q from the nozzle 15, the supply source of the cleaning gas Q2 may be disposed on, for example, the vehicle M side.

In the present embodiment, in the state in which the mirror main body 20 is disposed in the set position P1, the light transmission region 22 is disposed in a position shifted from the ejection direction of the fluid Q ejected from the nozzle 15. In addition, in the state in which the mirror main body 20 is disposed in the cleaning position P2, the light transmission region 22 is disposed on the ejection direction of the fluid Q from the nozzle 15. Specifically, the cleaning position P2 is such a position of the mirror main body 20 that the light transmission region 22 is disposed in the ejection direction of the fluid Q ejected from the nozzle 15. This arrangement enables the nozzle 15 to eject the fluid Q to the light transmission region 22.

In the present embodiment, the light transmission region 22 can be cleaned by ejecting the fluid Q from the nozzle 15 in the state in which the mirror main body 20 is disposed in the cleaning position P2. The cleaning position P2 may be disposed in a position that can be set as the set position P1 of the mirror main body 20, or disposed in a position exceeding the range that can be set as the set position P1.

Figure 25:
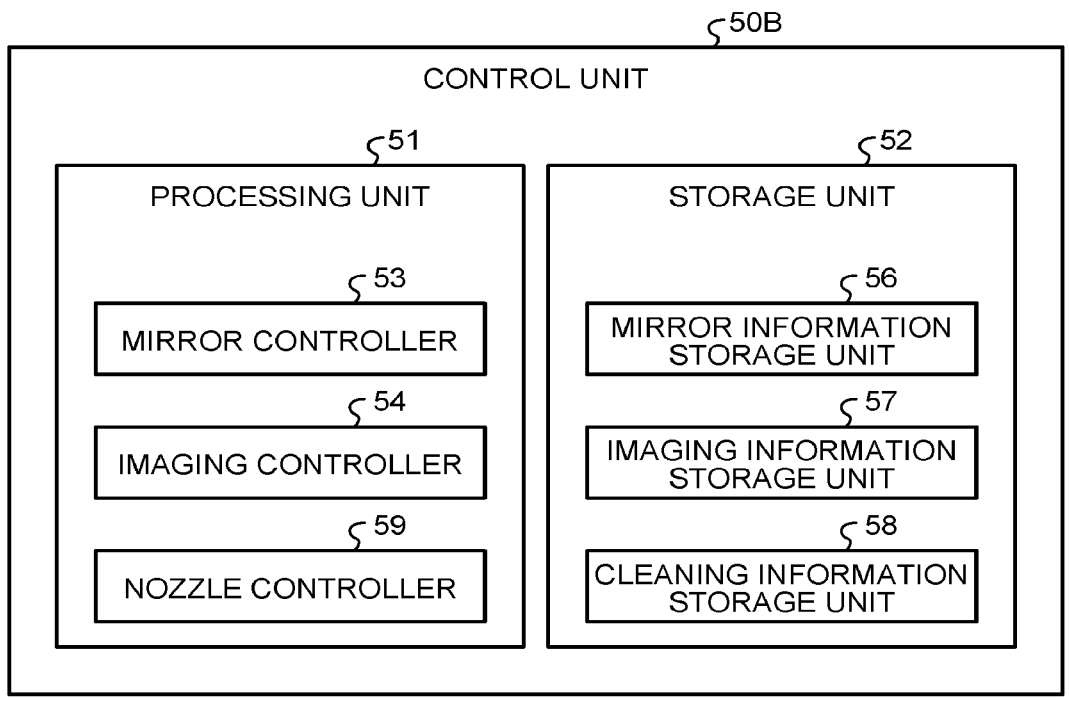
FIG. 25 is a block diagram illustrating an example of a control unit.

The control unit 50B controls operations of the door mirror device 100. The control unit 50B comprehensively controls, for example, operations of the housing 10, the nozzle 15, the mirror drive unit 30, and the imaging unit 40 described above. FIG. 25 is a block diagram illustrating an example of the control unit 50B. As illustrated in FIG. 25, the control unit SOB includes a processing unit 51 and a storage unit 52. The processing unit 51 includes a mirror controller 53, an imaging controller 54, and a nozzle controller 59.

The mirror controller 53 controls operations of the mirror drive unit 30 by outputting a control signal to the mirror drive unit 30. For example, when an operation to change the position of the mirror main body 20 is input from the vehicle M by the driver or the like, the mirror controller 53 outputs a control signal corresponding to the operation.

The imaging controller 54 controls operations of the imaging unit 40 by outputting a control signal to the imaging unit 40. For example, when an operation to operate the electrical system of the vehicle M is input by the driver's operation or the like, the imaging controller 54 outputs a control signal. In this case, when the electrical system of the vehicle M operates, the imaging controller 54 may output a control signal to the imaging unit 40, even when the engine of the vehicle M is not started up.

The nozzle controller 59 controls operations of the nozzle 15 by outputting a control signal to the nozzle 15. For example, when an operation to perform a cleaning operation is performed by the driver or the like in the vehicle M, such as pushing a cleaning button (not illustrated) provided in the vehicle M, the nozzle controller 59 outputs a control signal corresponding to the operation. With respect to the timing to perform a cleaning operation, the nozzle controller 59 may be configured to perform no cleaning operation when, for example, the vehicle M is traveling, even when an operation to perform a cleaning operation is performed. Examples of the cases where the vehicle M is traveling include the case where the parking brake provided on the vehicle M is in the off state and the case where the shift lever is shifted to the drive state. As another example, the nozzle controller 59 may cause the nozzle to perform a cleaning operation in linkage with an operation of a rear washer provided on the vehicle M. For example, the nozzle controller 59 may cause the nozzle to perform a cleaning operation when the rear washer is used a certain number of times from the reference point in time. This means that a cleaning operation is performed once whenever the rear washer is used a certain number of times. As another example, dirt in the light transmission region 22 may be detected on the basis of the image imaged with the imaging unit 40, and the nozzle controller 59 may cause the nozzle to perform a cleaning operation on the basis of the detection result. In this manner, for example, when the light transmission region 22 becomes dirty to a certain degree or more, a cleaning operation is automatically performed. When the fluid Q is ejected from the nozzle 15, the nozzle controller 59 controls selection of the ejection fluid (cleaning liquid Q1, cleaning gas Q2), the timing of starting ejection, the ejection time, and the ejection quantity per unit time and the like.

The storage unit 52 includes a mirror information storage unit 56, an imaging information storage unit 57, and a cleaning information storage unit 58. The mirror information storage unit 56 stores therein information relating to the position of the mirror main body 20 and the like. For example, the mirror information storage unit 56 stores therein the set position P1 set by operating the operating unit disposed in the vehicle M by the driver or the like. The mirror information storage unit 56 also stores therein the cleaning position P2 of the mirror main body 20 in the case of performing a cleaning operation with the nozzle 15.

For example, the mirror information storage unit 56 stores therein an inclination angle between the reflection optical axis AX1 and a certain reference direction for each of the directions around the vertical axis AXV and the horizontal axis AXH. For example, the certain reference direction may be set to the direction along the reflection optical axis AX1 in the case where the mirror main body 20 is in the initial position. In this case, the initial position is such a position that the mirror main body 20 is disposed in the intermediate position of the movable range in each of the directions around the vertical axis AXV and the horizontal axis AXH.

When the position of the mirror main body 20 is changed with the mirror drive unit 30, the mirror information storage unit 56 stores therein the rotation direction and the rotation quantity in the direction around the vertical axis AXV and the rotation direction and the rotation quantity in the direction around the horizontal axis AXH. On the basis of these pieces of information, the mirror information storage unit 56 can calculate, for example, in which direction and by what angle the mirror main body 20 is inclined with respect to the reference direction in each of the directions around the vertical axis AXV and the horizontal axis AXH. The mirror information storage unit 56 may store the calculated inclination directions and the inclination angles.

The imaging information storage unit 57 stores therein information relating to imaging with the imaging unit 40. The imaging information storage unit 57 stores therein, for example, data of the captured image imaged with the imaging unit 40.

The cleaning information storage unit 58 stores therein information relating to cleaning operations with the nozzle 15. The cleaning information storage unit 58 stores therein data relating to a program to perform a cleaning operation with the nozzle 15, the ejection fluid (cleaning liquid Q1, cleaning gas Q2) to be ejected from the nozzle 15, the timing of starting ejection, the ejection time, and the ejection quantity per unit time and the like.

Figure 26:
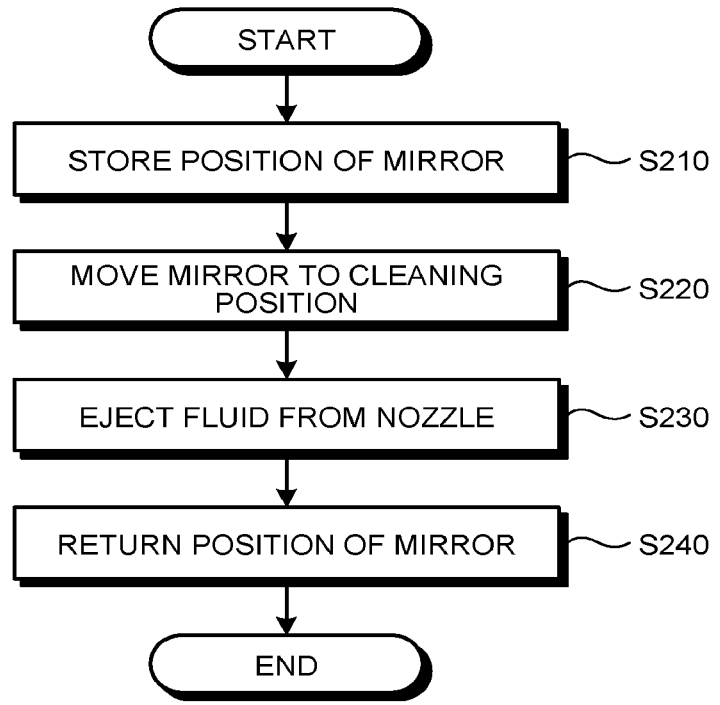
FIG. 26 is a flowchart illustrating a method for controlling the outer mirror device.

The following is an explanation of the method for controlling the door mirror device 100 structured as described above, with reference to FIG. 26 to FIG. 31. The following explanation illustrates the case of performing a cleaning operation with the nozzle 15 when the vehicle M is in a stopped state, as an example. FIG. 26 is a flowchart illustrating an example of the method for controlling the door mirror device 100. FIG. 27 to FIG. 31 are diagrams illustrating states of the door mirror device 100 in respective steps of the cleaning operation.

Figure 27:
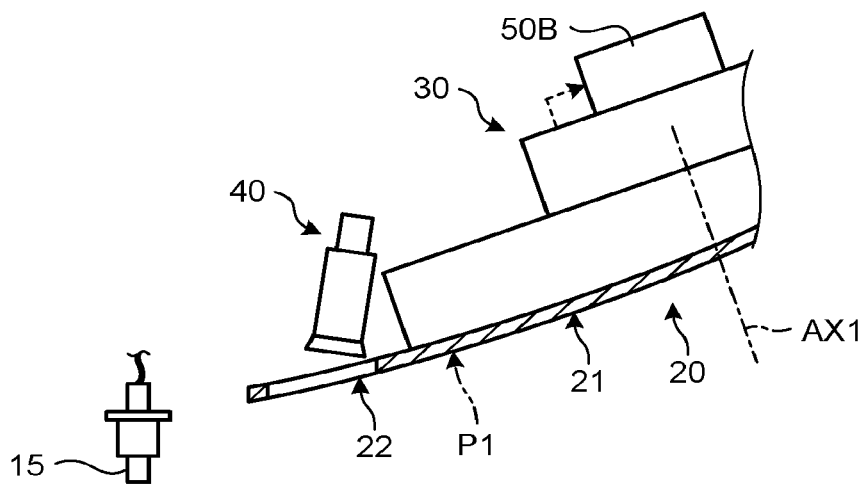
FIG. 27 is a diagram illustrating a state of the outer mirror device in a step of a cleaning operation.
Figure 28:
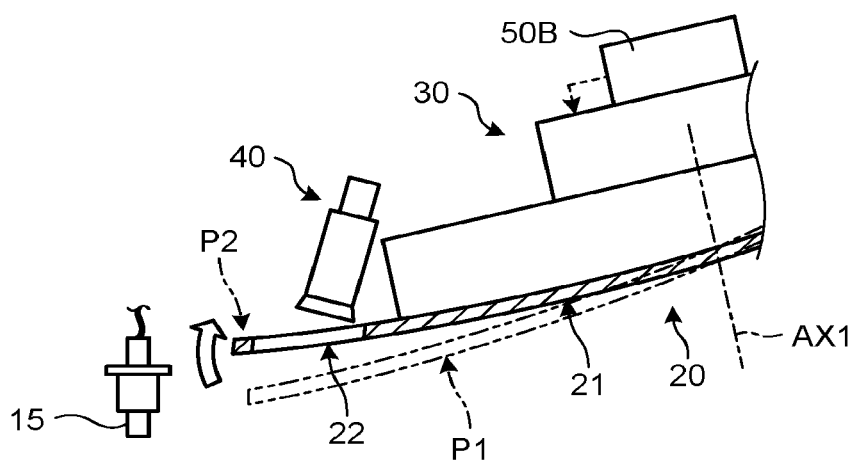
FIG. 28 is a diagram illustrating a state of the outer mirror device in a step of the cleaning operation.

When an operation to perform a cleaning operation is performed by the driver or the like in the vehicle M, the mirror controller 53 causes the mirror information storage unit 56 of the storage unit 52 to store therein the set position P1 of the mirror main body 20, as illustrated in FIG. 27 (Step S210). Thereafter, the mirror controller 53 causes the mirror main body 20 to move to the cleaning position P2, as illustrated in FIG. 28 (Step S220).

Figure 29:
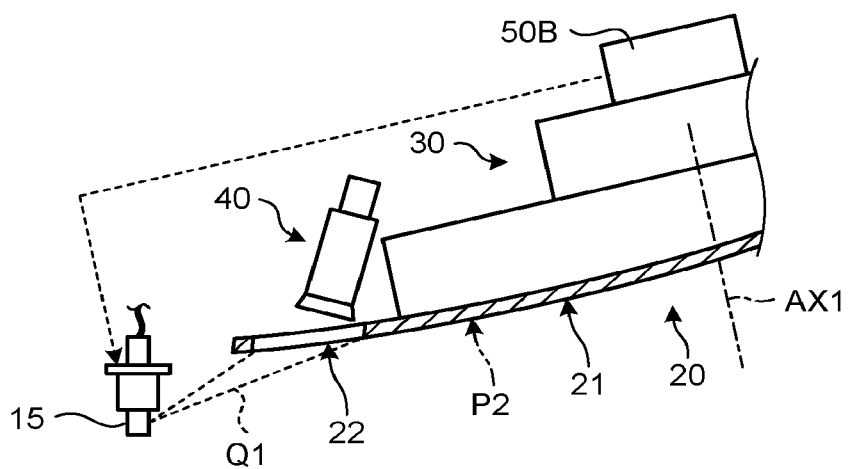
FIG. 29 is a diagram illustrating a state of the outer mirror device in a step of the cleaning operation.
Figure 30:
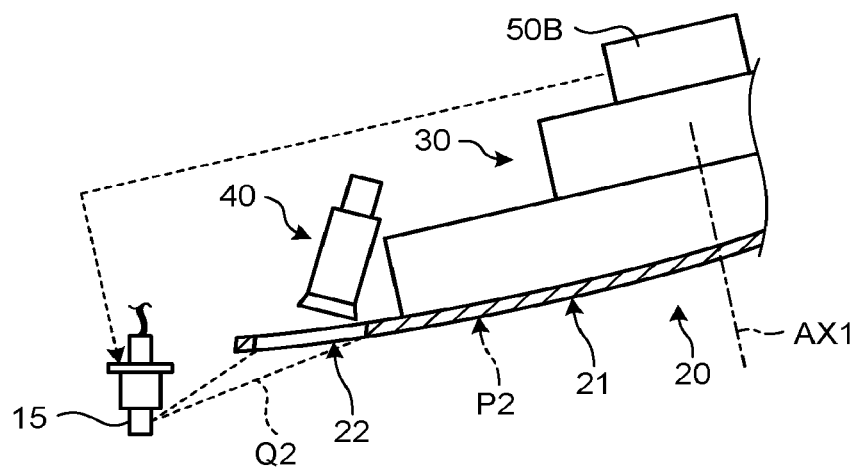
FIG. 30 is a diagram illustrating a state of the outer mirror device in a step of the cleaning operation.

After the mirror main body 20 is moved to the cleaning position P2, the nozzle controller 59 causes the fluid to be ejected from the nozzle 15 (Step S230). At Step S230, first, the nozzle controller 59 causes the cleaning liquid Q1 as the fluid Q to be ejected from the nozzle 15, as illustrated in FIG. 29. The cleaning liquid Q1 ejected from the nozzle 15 reaches the light transmission region 22 of the mirror main body 20 disposed in the ejection direction. For example, when a foreign substance or the like adheres to the outer surface of the light transmission region 22, the foreign substance or the like is removed with the cleaning liquid Q1. After the cleaning liquid Q1 is ejected for a certain period of time, the nozzle controller 59 causes the cleaning gas Q2 as the fluid Q to be ejected from the nozzle 15, as illustrated in FIG. 30. The cleaning gas Q2 ejected from the nozzle 15 reaches the light transmission region 22 disposed in the ejection direction. For example, when the residual of the cleaning liquid Q1 or the like adheres to the outer surface of the light transmission region 22, the residual of the cleaning liquid Q1 or the like is removed with the cleaning gas Q2.

Figure 31:
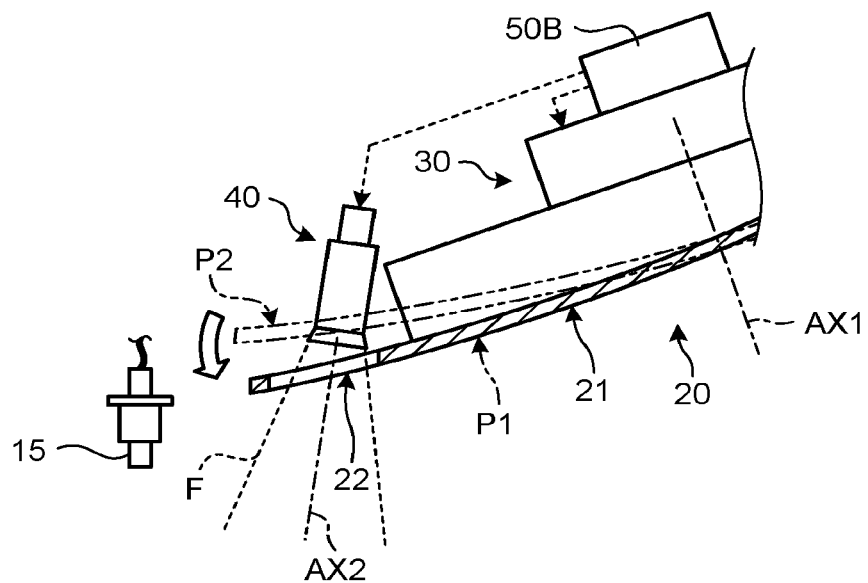
FIG. 31 is a diagram illustrating a state of the outer mirror device in a step of the cleaning operation.

After the liquid Q is ejected from the nozzle 15, the mirror controller 53 returns the mirror main body 20 from the cleaning position P2 to the set position P1, as illustrated in FIG. 31 (Step S240). At Step S240, the mirror controller 53 adjusts the position of the mirror main body 20 with the mirror drive unit 30 using the positional information of the set position P1 stored in the mirror information storage unit 56.

As described above, the door mirror device 100 according to the present embodiment includes: the housing 10 attached to the door DL or DR of the vehicle M and including the opening 10a facing the rear of the vehicle M; the mirror main body 20 disposed in the opening 10a of the housing 10 and having the light reflection region 21 reflecting light entering from the outside of the housing 10; and the nozzle 15 provided on the housing 10 and ejecting fluid Q toward the mirror main body 20.

This structure enables removal of a foreign substance or the like with the fluid Q ejected from the nozzle 15, when the foreign substance or the like adheres to the outer surface 20a of the mirror main body 20. This structure reduces trouble of the driver or the like, such as manually removing the foreign substance or the like, and enables efficient removal of the foreign substance or the like adhering to the outer surface 20a of the mirror main body 20.

In the door mirror device 100 described above, the nozzle 15 is fixed to eject the fluid in one direction, the mirror main body 20 includes the light transmission region 22 capable of transmitting the light entering from the outside of the housing 10 to the inside of the housing 10 and is movable between the set position P1 set with the vehicle M and the cleaning position P2 where the light transmission region 22 is disposed in the ejection direction of the fluid Q ejected from the nozzle 15, and the door mirror device 100 further includes the imaging unit 40 fixed inside the housing 10 and imaging the rear of the vehicle M via the light transmission region 22. This structure enables removal of a foreign substance or the like with the fluid Q ejected from the nozzle 15, when the foreign substance or the like adheres to the outer surface of the light transmission region 22 in the mirror main body 20. This structure suppresses imaging of the foreign substance or the like with the imaging unit 40, and enables display of a clear image on the display unit of the vehicle M.

In addition, the door mirror device 100 described above further includes: the mirror drive unit 30 disposed inside the housing 10 and adjusting the position of the mirror main body 20 between the set position P1 and the cleaning position P2; and the control unit 50B configured to cause the nozzle 15 to perform a non-cleaning operation of not ejecting the fluid Q and a cleaning operation of ejecting the fluid Q in a switching manner in accordance with an instruction from the vehicle M, and control the mirror drive unit 30 to dispose the mirror main body 20 in the set position P1 when causing the nozzle 15 to perform the non-cleaning operation and dispose the mirror main body 20 in the cleaning position P2 when causing the nozzle 15 to perform the cleaning operation. This structure enables automatic movement of the position of the mirror main body 20 to the position P1 in the non-cleaning operation and to the cleaning position P2 in the cleaning operation, and enables efficient switching between the non-cleaning operation and the cleaning operation.

The door mirror device 100 described above includes the storage unit 52 configured to store therein the set position P1, and the control unit 50B controls the mirror drive unit 30 such that, after the fluid Q is ejected, the mirror main body 20 disposed in the cleaning position P2 is caused to be disposed in the set position P1 that is immediately before the mirror main body 20 is moved to the cleaning position P2 in the set positions P stored in the storage unit 52. This structure enables easily returning of the mirror main body 20 to the previous position before the cleaning operation, after the cleaning operation is performed.

The method for controlling the door mirror device 100 according to the present invention is a method for controlling the door mirror device 100 that includes: the housing 10 attached to the door DL or DR of the vehicle M and including the opening 10a facing the rear of the vehicle M; the mirror main body 20 disposed in the opening 10a of the housing 10, having the light reflection region 21 reflecting light entering from the outside of the housing 10 and the light transmission region 22 capable of transmitting the light entering from the outside of the housing 10 to the inside of the housing 10, and being movable between the set position P1 set with the vehicle M and the cleaning position P2 where the light transmission region 22 is disposed in the ejection direction of the fluid Q ejected from the nozzle 15; the imaging unit 40 fixed inside the housing 10 and imaging the rear of the vehicle M through the light transmission region 22; the mirror drive unit 30 disposed inside the housing 10 and configured to adjust the position of the mirror main body 20 between the set position P1 and the cleaning position P2; and the nozzle 15 provided on the housing 10 and ejecting fluid Q toward the mirror main body 20. The method includes causing the nozzle 15 to perform a non-cleaning operation of not ejecting the fluid Q and a cleaning operation of ejecting the fluid Q in a switching manner in accordance with an instruction from the vehicle M, disposing the mirror main body 20 in the set position P1 when causing the nozzle 15 to perform the non-cleaning operation, and disposing the mirror main body 20 in the cleaning position P2 when causing the nozzle 15 to perform the cleaning operation.

This structure enables removal of a foreign substance or the like with the fluid Q ejected from the nozzle 15, when the foreign substance or the like adheres to the outer surface 20a of the mirror main body 20. This structure reduces trouble of the driver or the like, such as manually removing the foreign substance or the like, and enables efficient removal of the foreign substance or the like adhering to the outer surface 20a of the mirror main body 20. This structure also enables removal of a foreign substance or the like with the fluid Q ejected from the nozzle 15, when the foreign substance or the like adheres to the outer surface of the light transmission region 22 in the mirror main body 20. This structure suppresses imaging of the foreign substance or the like with the imaging unit 40, and enables display of a clear image on the display unit of the vehicle M. This structure also enables automatic movement of the position of the mirror main body 20 to the position P1 in the non-cleaning operation and to the cleaning position P2 in the cleaning operation, and enables efficient switching between the non-cleaning operation and the cleaning operation.

The third embodiment illustrates the structure in which the door mirror device 100 includes the light transmission region 22 in the mirror main body 20, and the rear is imaged with the imaging unit 40 through the light transmission region 22, as an example, but the structure is not limited thereto. For example, the structure may be a structure in which fluid is ejected to the outer surface of the mirror main body with a nozzle, in an outer mirror device provided with no imaging unit.

In addition, the third embodiment illustrates the case where the imaging unit 40 is fixed on the inner surface 20b of the mirror main body 20, as an example, but the structure is not limited thereto. The imaging unit 40 may be fixed in another position, such as the inner surface of the casing 12 and the inner wall portion 13, as long as it is fixed inside the housing 10.

The technical scope of the present invention is not limited to the embodiments described above, but proper modifications may be added within a range not departing from the spirit of the invention. For example, the embodiments described above illustrate the door mirror devices 100, 100A, and 100B as the vehicle outer mirror devices as examples, but the structure is not limited thereto. The vehicle outer mirror device may be, for example, a fender mirror.

With respect to the structures described in the embodiments described above, structures described in different embodiments may be properly used in combination.

REFERENCE SIGNS LIST

α ANGLE RANGE
α1, β, β2 ANGLE
AX1, AX3 REFLECTION OPTICAL AXIS
AX2, AX4 IMAGING OPTICAL AXIS
AXH HORIZONTAL AXIS
AXL FRONT-REAR AXIS
AXV VERTICAL AXIS
D DIRECTION
DL, DR DOOR
DP DISPLAY UNIT
E, E1, E2, E3, E4, E5, E2a, E3a EXTRACTION REGION
F VISUAL FIELD
F1, F2, F3 VISUAL FIELD PORTION
H STEERING WHEEL
IM, IM1, IM2, IM3, IM4, IM5 EXTRACTION IMAGE
M VEHICLE
P, PA, PB, PC CAPTURED IMAGE
P1 SET POSITION
P2 CLEANING POSITION
Q FLUID
Q1 CLEANING LIQUID
Q2 CLEANING GAS
R, RA, RB, RC STATE
R1, R2 RANGE
S SEAT, DRIVER'S SEAT
SYS DOOR MIRROR SYSTEM
10 HOUSING
10a OPENING
11 BASE PORTION
12 HOUSING
12a EDGE PORTION
13 INNER WALL PORTION
13a GAP
14 LIGHT SHIELD PORTION
15 NOZZLE
20, 120 MIRROR MAIN BODY
20a OUTER SURFACE
20b INNER SURFACE
21, 121 LIGHT REFLECTION REGION
22 LIGHT TRANSMISSION REGION
30 MIRROR DRIVE UNIT
40, 140 IMAGING UNIT
50 CONTROL UNIT
51 PROCESSING UNIT
52 STORAGE UNIT
53 MIRROR CONTROLLER
54 IMAGING CONTROLLER
55 IMAGE PROCESSING UNIT
56 MIRROR INFORMATION STORAGE UNIT
57 IMAGING INFORMATION STORAGE UNIT
58 CLEANING INFORMATION STORAGE UNIT
59 NOZZLE CONTROLLER
100, 100A, 101, 102, 200 DOOR MIRROR DEVICE

The invention claimed is:

1. A vehicle outer mirror device comprising:
a housing attached to a door of a vehicle and including an edge portion, the edge portion having an annular shape and forming an opening facing rear of the vehicle;
a mirror main body disposed in the opening of the housing and having a light reflection region reflecting light entering from outside of the housing and a light transmission region capable of transmitting the light entering from the outside of the housing to inside of the housing;
an imaging unit fixed inside the housing and imaging the rear of the vehicle through the light transmission region;
a nozzle provided on the housing and ejecting fluid toward the mirror main body to perform a cleaning operation, the nozzle being provided on an inner surface side of the edge portion of the housing; and
a nozzle controller configured to detect dirt of the light transmission region from a captured image imaged with the imaging unit and cause the nozzle to perform the cleaning operation based on a detection result,
wherein the housing includes a peripheral wall that surrounds the mirror main body, and
wherein the edge portion projects at an angle from the peripheral wall toward the inside of the housing so as to shield the nozzle from the outside of the housing.

2. The vehicle mirror device according to claim 1, wherein
the nozzle is disposed on a side of the mirror main body as viewed from an axis direction of a reflection optical axis of the light reflection region, and
the mirror main body is movable between a set position set with the vehicle and a cleaning position where the light transmission region is disposed in an ejection direction of the fluid ejected from the nozzle.

3. The vehicle outer mirror device according to claim 2, further comprising:
a mirror drive unit disposed inside the housing and configured to adjust a position of the mirror main body between the set position and the cleaning position; and
a control unit configured to cause the nozzle to perform a non-cleaning operation of not ejecting the fluid and a cleaning operation of ejecting the fluid in a switching manner in accordance with an instruction from the vehicle, and control the mirror drive unit to dispose the mirror main body in the set position when causing the nozzle to perform the non-cleaning operation and dispose the mirror main body in the cleaning position when causing the nozzle to perform the cleaning operation.

4. The vehicle outer mirror device according to claim 3, further comprising:

a storage unit configured to store therein the set position, wherein the control unit controls the mirror drive unit such that, after the fluid is ejected, the mirror main body disposed in the cleaning position is disposed in a previous set position before the mirror main body is moved to the cleaning position among a plurality of the set positions stored in the storage unit.

5. A method for controlling a vehicle outer mirror device that includes:
- a housing attached to a door of a vehicle and including an edge portion, the edge portion having an annular shape and forming an opening facing rear of the vehicle;
- a mirror main body disposed in the opening of the housing, having a light reflection region reflecting light entering from outside of the housing and a light transmission region capable of transmitting the light entering from the outside of the housing to inside of the housing, and being movable between a set position set with the vehicle and a cleaning position where the light transmission region is disposed in an ejection direction of fluid ejected from a nozzle;
- an imaging unit fixed inside the housing and imaging the rear of the vehicle through the light transmission region;
- a mirror drive unit disposed inside the housing and configured to adjust a position of the mirror main body between the set position and the cleaning position; and
- the nozzle provided on the housing and ejecting the fluid toward the mirror main body, the nozzle being provided on an inner surface side of the edge portion of the housing, wherein the housing includes a peripheral wall that surrounds the mirror main body, and wherein the edge portion projects at an angle from the peripheral wall toward the inside of the housing so as to shield the nozzle from the outside of the housing, the method comprising:
- detecting dirt of the light transmission region from a captured image imaged with the imaging unit;
- causing the nozzle to perform a non-cleaning operation of not ejecting the fluid and a cleaning operation of ejecting the fluid in a switching manner based on a detection result;
- disposing the mirror main body in the set position when causing the nozzle to perform the non-cleaning operation; and
- disposing the mirror main body in the cleaning position when causing the nozzle to perform the cleaning operation.

* * * * *